United States Patent
Yang et al.

(10) Patent No.: US 9,578,329 B2
(45) Date of Patent: Feb. 21, 2017

(54) VIDEO ENCODING METHOD WITH INTRA PREDICTION USING CHECKING PROCESS FOR UNIFIED REFERENCE POSSIBILITY, VIDEO DECODING METHOD AND DEVICE THEREOF

(75) Inventors: Hee-chul Yang, Suwon-si (KR); Young-jin Kwak, Yongin-si (KR); Kwang-pyo Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 605 days.

(21) Appl. No.: 14/130,595

(22) PCT Filed: Jul. 2, 2012

(86) PCT No.: PCT/KR2012/005246
§ 371 (c)(1),
(2), (4) Date: Jan. 2, 2014

(87) PCT Pub. No.: WO2013/005962
PCT Pub. Date: Jan. 10, 2013

(65) Prior Publication Data
US 2014/0153646 A1   Jun. 5, 2014

Related U.S. Application Data

(60) Provisional application No. 61/503,857, filed on Jul. 1, 2011.

(51) Int. Cl.
*H04N 19/593* (2014.01)
*H04N 19/176* (2014.01)
(Continued)

(52) U.S. Cl.
CPC ..... *H04N 19/00763* (2013.01); *H04N 19/105* (2014.11); *H04N 19/11* (2014.11);
(Continued)

(58) Field of Classification Search
CPC ................................. H04N 19/00763
(Continued)

(56) References Cited

U.S. PATENT DOCUMENTS

| 8,665,955 B2 | 3/2014 | Bourge et al. |
| 2005/0265447 A1 | 12/2005 | Park |

(Continued)

FOREIGN PATENT DOCUMENTS

| CN | 1703096 A | 11/2005 |
| CN | 1965585 A | 5/2007 |

(Continued)

OTHER PUBLICATIONS

Sjoberg,R. et al., "BoG report on padding of unavailable reference samples for intra prediction", JCTVC-E488, URL:http://phenix.it-sudparis.eu/jct/doc_end_user/documents/5_Geneva/wg11/JCTVC-E488-v1.zip, Mar. 19, 2011, pp. 1-5.
(Continued)

*Primary Examiner* — Yulin Sun
(74) *Attorney, Agent, or Firm* — Sughrue Mion, PLLC

(57) ABSTRACT

An intra prediction method includes searching for a neighboring block restored prior to a current block from among blocks of an image; checking whether the neighboring block found by the searching is a block restored in an intra mode and whether an intra mode of the current block is also a Combined Intra Prediction (CIP) mode in which only blocks pre-restored in the intra mode are referred to; determining based on a checking result of the checking whether the found neighboring block is a reference block available for intra prediction of the current block; and performing intra prediction on the current block by using sample values of the reference block determined as available for the intra prediction of the current block.

15 Claims, 18 Drawing Sheets

(51) Int. Cl.

| | | |
|---|---|---|
| *H04N 19/70* | (2014.01) | |
| *H04N 19/11* | (2014.01) | |
| *H04N 19/157* | (2014.01) | |
| *H04N 19/105* | (2014.01) | |
| *H04N 19/182* | (2014.01) | |
| *H04N 19/167* | (2014.01) | |
| *H04N 19/96* | (2014.01) | |

(52) U.S. Cl.
CPC ......... *H04N 19/157* (2014.11); *H04N 19/167* (2014.11); *H04N 19/176* (2014.11); *H04N 19/182* (2014.11); *H04N 19/593* (2014.11); *H04N 19/70* (2014.11); *H04N 19/96* (2014.11)

(58) Field of Classification Search
USPC ..................................................... 375/240.12
See application file for complete search history.

(56) References Cited

U.S. PATENT DOCUMENTS

| | | | |
|---|---|---|---|
| 2007/0002945 A1 | 1/2007 | Kim | |
| 2010/0086034 A1 | 4/2010 | Park et al. | |
| 2010/0290527 A1 | 11/2010 | Park et al. | |
| 2011/0038415 A1 | 2/2011 | Min et al. | |
| 2011/0261882 A1* | 10/2011 | Zheng | H04N 19/105 375/240.13 |
| 2011/0280304 A1* | 11/2011 | Jeon | H04N 19/105 375/240.12 |
| 2013/0329791 A1 | 12/2013 | Min et al. | |

FOREIGN PATENT DOCUMENTS

| | | |
|---|---|---|
| KR | 1020050112445 A | 11/2005 |
| KR | 1020070001621 A | 1/2007 |
| KR | 1020100122450 A | 11/2010 |
| KR | 1020110018189 A | 2/2011 |
| WO | 2009/126260 A1 | 10/2009 |
| WO | 2011021839 A2 | 2/2011 |

OTHER PUBLICATIONS

Communication from the Japanese Patent Office dated Dec. 9, 2014, in a counterpart Japanese application No. 2014-518818.
R. Sjoberg, C. Lai, K. Chono, V. Wahadaniah,"BoG report on padding of unavailable reference samples for intra prediction", JCT-VC document JCTVC-E488, Joint Collaborative Team on Video Coding (JCT-VC) of ITU-T SG 16 WP3 and ISO/IEC JTC1/SC29/VVG11, 5th meeting, Geneva, CH, Mar. 16-31, 2011.
R. Sjoberg, S. Lei, Y. Huang, Q. Shen, "BoG on fine granularity slices", JCT-VC document JCTVC-E483, Joint Collaborative Team on Video Coding (JCT-VC) of ITU-T SG 16 WP3 and ISO/IEC JTC1/SC29/WG11, 5th meeting, Geneva, CH, Mar. 16-23, 2011.
F. Bossen, "Common test conditions and software reference configurations", Joint Collaborative Team on Video Coding (JCT-VC) of ITU-T SG16 WP3 and ISO/IEC JTC1/SC29/WG11, JCTVC-O500, 3rd Meeting: Guangzhou, CN, Oct. 7-15, 2010.
International Search Report dated Jan. 17, 2013 from the International Searching authority in counterpart application No. PCT/KR2012/005246.
Communication dated Jun. 29, 2016, issued by the State Intellectual Property Office of P.R. China in counterpart Chinese Application No. 201280042780.5.
Communication dated Oct. 28, 2015 issued by Taiwan Intellectual Property Office of the Ministry of Economic Affairs in counterpart Taiwanese Patent Application No. 101123766.
Communication dated Dec. 22, 2015 issued by European Patent Office in counterpart European Patent Application No. 12807831.8.
Wahadaniah et al., "Constrained Intra Prediction Scheme for Flexible-Sized Prediction Units in HEVC", Joint Collaborative Team on Video Coding (JCT-VC) of ITU-T SG-16 WP3 and ISO/IEC JTC1/SC29/WG11, Jan. 20-28, 2011, 8 pages total, 4th Meeting, Panasonic Corporation, Daegu, KR, JCTVC-D094.
Chono et al., "Constrained intra prediction for reducing visual artifacts caused by lossy decoderside memory compression", Joint Collaborative Team on Video Coding (JCT-VC) of ITU-T SG16 WP3 and ISO/IEC JTC1/SC29/WG11, Jan. 20-28, 2011, 8 pages total, 4th Meeting, NEC Corporation and Panasonic Corporation, Daegu, KR, JCTVC-D086.
Communication issued Dec. 14, 2016, issued by the Intellectual Property Office of the Philippines in counterpart Philippine Patent Application No. 1/2014/500014.

* cited by examiner

CODING UNIT (1010)

VIDEO ENCODING METHOD WITH INTRA PREDICTION USING CHECKING PROCESS FOR UNIFIED REFERENCE POSSIBILITY, VIDEO DECODING METHOD AND DEVICE THEREOF

CROSS-REFERENCE TO RELATED APPLICATIONS

This application is a National Stage Entry of PCT/KR2012/005246, filed on Jul. 2, 2012, which claims priority to U.S. provisional patent application No. 61/503,857, filed on Jul. 1, 2011 in the U.S. Patent and Trademark Office, the entire disclosures of which are herein incorporated by reference in their entirety.

TECHNICAL FIELD

Exemplary embodiments relate to encoding and decoding a video with intra prediction.

BACKGROUND OF THE RELATED ART

As hardware for reproducing and storing high resolution or high quality video content is being developed and supplied, a need for a video codec for effectively encoding or decoding the high resolution or high quality video content is increasing. In a conventional video codec, a video is encoded according to a limited encoding method based on a macroblock having a predetermined size.

Image data in a spatial domain is transformed to coefficients in a frequency domain by using frequency transformation. A video codec encodes frequency coefficients according to block units by splitting image data into blocks having a predetermined size and performing Discrete Cosine Transform (DCT) transformation on each block to quickly compute the frequency transformation. The coefficients in the frequency domain are more easily compressed than the image data in the spatial domain. Specifically, since an image pixel value of the spatial domain is expressed as a prediction error by inter prediction or intra prediction of the video codec, when the frequency transformation is performed on the prediction error, a substantial amount of data may be transformed to 0. The video codec saves a data amount by replacing repeatedly generated data with data having a small size.

SUMMARY

Exemplary embodiments provide a video encoding method and apparatus for prediction encoding of an intra mode with intra prediction, and a video decoding method and apparatus.

According to an aspect of an exemplary embodiment, there is provided an intra prediction method including: searching for a neighboring block restored prior to a current block from among blocks of an image; checking whether the neighboring block found by the searching is a block restored in an intra mode and whether an intra mode of the current block is also a Combined Intra Prediction (CIP) mode in which only blocks pre-restored in the intra mode are referred to; determining based on a checking result of the checking whether the found neighboring block is a reference block available for intra prediction of the current block; and performing intra prediction on the current block by using sample values of the reference block determined as available for the intra prediction of the current black.

In order to perform intra prediction on a current block, a process of searching for an intra reference block when the current block is in the CIP mode and a process of searching for an intra reference block when the current block is not in the CIP mode do not have to be separated. The processes of searching for an intra reference block of the current block may be unified, thereby decreasing the process complexity. Also, even when a partial region of the intra reference block deviates from the boundary of the image, since a sample value of an available pixel adjacent to the boundary is padded to the reference region deviating from the boundary of the image regardless of whether the current block is not in the CIP mode, an intra prediction result in a case where the current block is in the CIP mode may be the same as an intra prediction result in a case where the current block is not in the CIP mode.

The searching for the neighboring block may include searching for neighboring blocks restored prior to the current block before determining whether a prediction mode of the current block is an intra mode of the CIP mode, and the checking may include checking whether each of the neighboring blocks found by the searching is restored in the intra mode and whether the intra mode of the current block is also the CIP mode.

The performing of the intra prediction may include padding a region deviating from a boundary of the image with a sample value of a pixel adjacent to an inside of the boundary from among pixels of the reference block when the reference block deviates from the boundary of the image.

The performing of the intra prediction may include padding the region deviating from a boundary of the image with a sample value of a pixel adjacent to the inside of the boundary from among pixels of the reference block when the reference block deviates from the boundary of the image regardless of whether the intra mode of the current block is the CIP mode.

According to another aspect of an exemplary embodiment, there is provided an intra prediction apparatus including: an intra reference block determiner configured to search for a neighboring block restored prior to a current block from among blocks of an image and determine whether the neighboring block found by the searching is a reference block available for intra prediction of the current block, based on a result of checking whether the found neighboring block is a block restored in an intra mode and whether an intra mode of the current block is also a Combined Intra Prediction (CIP) mode in which only blocks pre-restored in the intra mode are referred to; and an intra predictor configured to perform intra prediction on the current block by using sample values of the reference block determined as available for the intra prediction of the current block.

According to another aspect of an exemplary embodiment, there is provided a video decoding apparatus including: a parser configured to restore samples by performing entropy decoding on a bit string parsed from a received bitstream; an inverse transformer configured to restore samples by performing inverse quantization and inverse transformation on a quantized transformation coefficient from among the restored samples; an intra predictor configured to search for a neighboring block restored prior to a current block, determine whether the neighboring block found by the searching is a reference block available for intra prediction of the current block based on a result of checking whether the found neighboring block is a block restored in an intra mode and whether an intra mode of the current block is also a Combined Intra Prediction (CIP) mode in which only blocks pre-restored in the intra mode are referred to, and perform intra prediction on the current block by using sample values of the reference block, to perform the intra prediction on the current block that is in the intra mode from among the samples; a motion compensator configured to perform motion compensation on blocks in an inter prediction mode from among the samples; and a restorer configured to restore an image by using blocks restored by the inter prediction or the intra prediction.

According to another aspect of an exemplary embodiment, there is provided a video encoding apparatus including: an intra predictor configured to search for a neighboring block restored prior to a current block, determine whether the neighboring block found by the searching is a reference block available for intra prediction of the current block based on a result of checking whether the found neighboring block is a block restored in an intra mode and whether an intra mode of the current block is also a Combined Intra Prediction (CIP) mode in which only blocks pre-restored in the intra mode are referred to, and perform intra prediction on the current block by using sample values of the reference block determined to be available for the intra prediction of the current block, to perform the intra prediction on the current block that is in the intra mode from among blocks of a video; an inter predictor configured to perform inter prediction on blocks in an inter prediction mode from among the blocks; a transformer and quantizer configured to perform transformation and quantization on a result of performing the intra prediction or the inter prediction; and an output unit configured to output a bitstream generated by performing entropy encoding on samples including a quantized transformation coefficient generated as a result of the transformation and quantization.

According to another aspect of an exemplary embodiment, there is provided a non-transitory computer-readable recording medium having recorded thereon a program for executing the intra prediction method.

DETAILED DESCRIPTION OF EXEMPLARY EMBODIMENTS

Hereinafter, according to an exemplary embodiment, an intra prediction method and an intra prediction apparatus for determining availability according to an intra mode by using a unified process are disclosed with reference to FIGS. 1 through 5. Also, according to an exemplary embodiment, a video encoding method and a video decoding method, which include intra prediction, are disclosed with reference to FIGS. 6A and 6B. Also, according to an exemplary embodiment, a video encoding method and a video decoding method, which are based on coding units having a tree structure and including intra prediction, are disclosed with reference to FIGS. 7 through 19. Hereinafter, an 'image' may be a still image or a moving picture of a video, e.g., the video itself.

Hereinafter, according to an exemplary embodiment, an intra prediction method and an intra prediction apparatus for determining availability according to an intra mode by using a unified process are disclosed with reference to FIGS. 1 through 5. Also, a video encoding method and a video decoding method including the intra prediction method according to an exemplary embodiment are disclosed.

Figure 1:
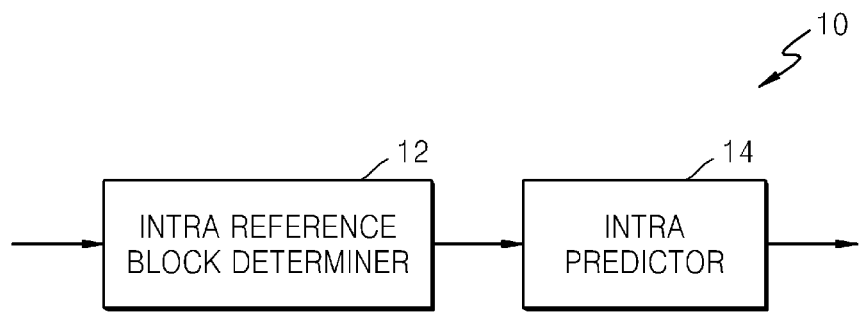
FIG. 1 is a block diagram of an intra prediction apparatus according to an exemplary embodiment.

FIG. 1 is a block diagram of an intra prediction apparatus 10 according to an exemplary embodiment.

The intra prediction apparatus 10 includes an intra reference block determiner 12 and an intra predictor 14.

The intra prediction apparatus 10 encodes a video on an image block basis. A type of a block may be a square, a rectangle, or an arbitrary geometric shape, but is not limited to a data unit having a predetermined size. A block according to an exemplary embodiment may be a maximum coding unit, a coding unit, a prediction unit, or a transformation unit from among coding units having a tree structure. Video encoding and decoding methods based on coding units having a tree structure will be described below with reference to FIGS. 7 through 19.

The intra reference block determiner 12 searches for a neighboring block restored prior to a current block from among neighboring blocks adjacent to the current block. Intra prediction may be performed on the current block by referring to neighboring blocks restored prior to the current block.

Intra prediction according to a CIP mode may refer to only blocks pre-restored in an intra mode. The intra reference block determiner 12 determines whether the pre-restored neighboring block is a block restored in the intra mode and whether the intra mode of the current block is also the CIP mode. In other words, the intra reference block determiner 12 may search for a neighboring block restored prior to the current block before determining whether the intra mode of the current block is the CIP mode. The intra reference block determiner 12 may determine whether the neighboring block is a block restored in the intra mode and whether the current block is also a block of the CIP mode, after searching for a neighboring block restored prior to the current block.

The intra reference block determiner 12 may determine whether the found neighboring block is a reference block available for intra prediction of the current block, based on a result of determining whether the found neighboring block is a block restored in the intra mode and whether the current block is also in the CIP mode.

For example, if the found neighboring block is a block restored in the intra mode, and the current block is in the CIP mode, the intra reference block determiner 12 may determine that the found neighboring block is a reference block available for intra prediction of the current block.

Also, if the found neighboring block is not a block restored in the intra mode, or the current block is not in the CIP mode, the intra reference block determiner 12 may determine that the found neighboring block is not a reference block available for intra prediction of the current block.

The intra predictor 14 may perform intra prediction on the current block by using sample values of the reference block. The intra predictor 14 may pad a sample value of a pixel adjacent to the inside of a boundary among pixels of the reference block to a region deviating from a boundary of an image, when the reference block deviates from the boundary of the image. In other words, the region deviating from the boundary of the image may be filled with the sample value of the adjacent pixel.

The intra predictor 14 may pad a sample value of a pixel adjacent to the inside of the boundary among the pixels of the reference block to the region deviating from the boundary of the image, when the reference block deviates from the boundary of the image, regardless of whether the intra mode of the current block is the CIP mode.

The intra predictor 14 may perform intra prediction of the current block by referring to the padded region.

The intra prediction apparatus 10 may further include a central process (not shown) for cooperatively controlling the intra reference block determiner 12 and the intra predictor 14. Alternatively, each of the intra reference block determiner 12 and the intra predictor 14 may be operated by its own processor (not shown), and the processors may operate organically to cooperatively operate the intra prediction apparatus 10. Alternatively, an external processor (not shown) of the intra prediction apparatus 10 may control the intra reference block determiner 12 and the intra predictor 14.

The intra prediction apparatus 10 may further include at least one data storage unit (e.g., data storage) (not shown) for storing input and output data of the intra reference block determiner 12 and the intra predictor 14. The intra prediction apparatus 10 may further include a memory controller (not shown) for controlling a data input and output of the at least one data storage unit.

According to the intra prediction apparatus 10, since it is determined whether neighboring blocks are blocks restored prior to a current block regardless of whether the current block is in the CIP mode, (i) a process of searching for an intra reference block when a current block is in the CIP mode and (ii) a process of searching for an intra reference block when the current block is not in the CIP mode do not have to be separated, and thus the processes of searching for an intra reference block of the current block may be unified, thereby decreasing the process complexity.

Also, even when a partial region of the intra reference block deviates from the boundary of the image, since a sample value of an available pixel adjacent to the boundary is padded to the reference region deviating from the boundary of the image regardless of whether the current block is not in the CIP mode, an intra prediction result in a case where the current block is in the CIP mode may be the same as an intra prediction result in a case where the current block is not in the CIP mode.

Figure 2A:
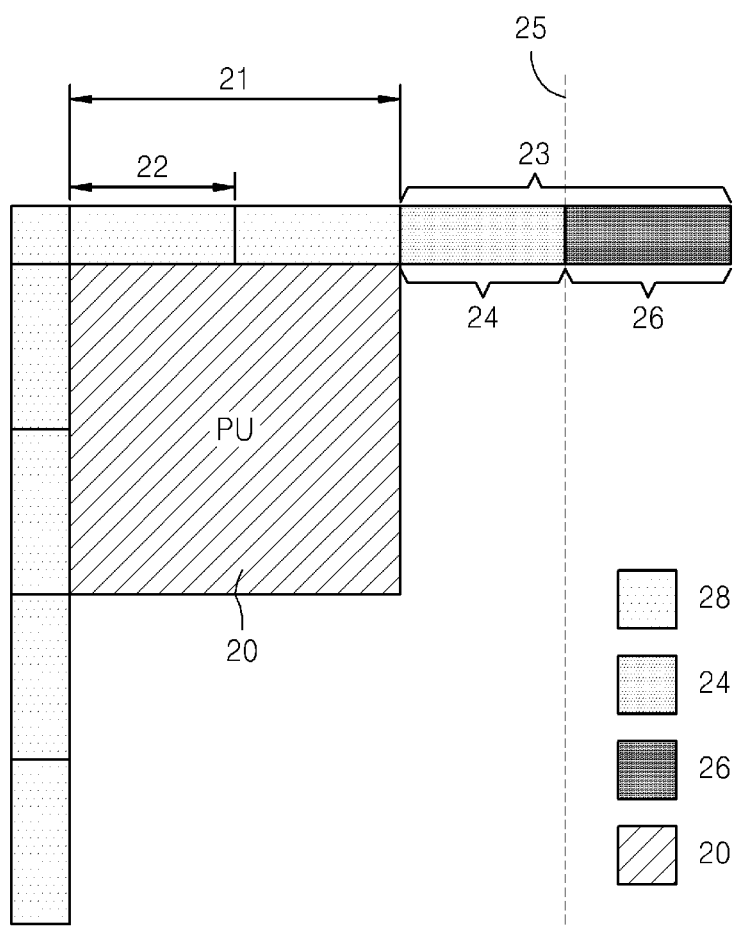
FIGS. 2A and 2B are diagrams for describing an intra prediction operation according to a CIP mode.
Figure 2B:
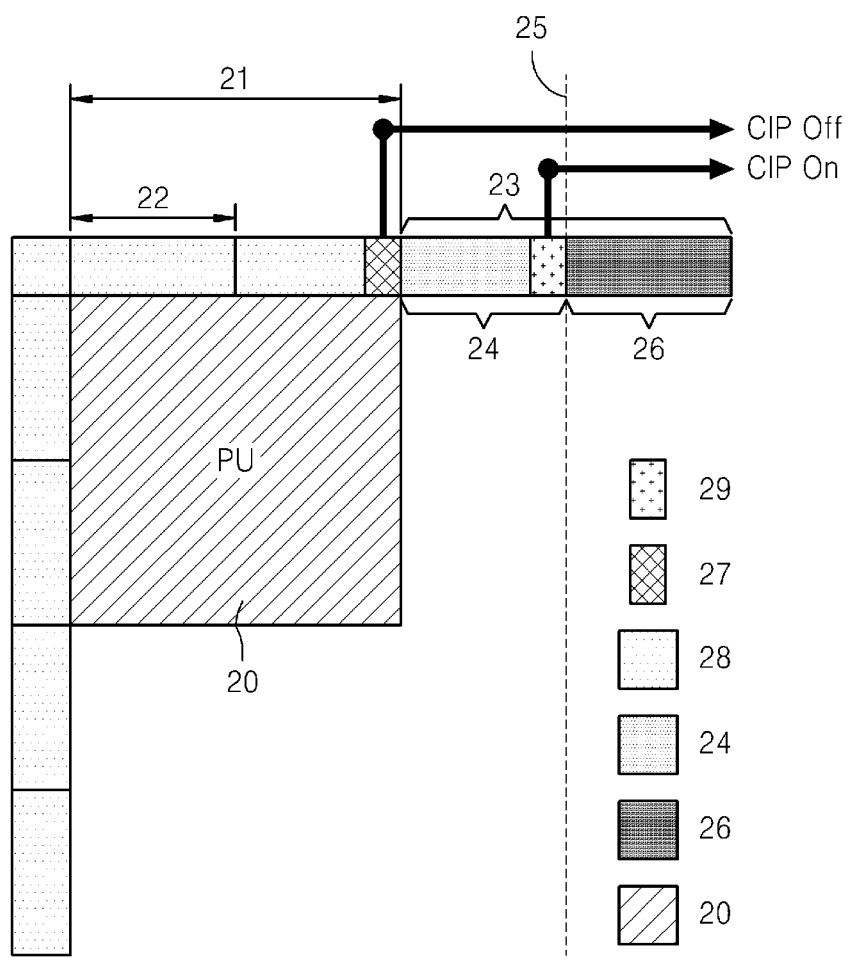

FIGS. 2A and 2B are diagrams for describing an intra prediction operation according to a CIP mode.

An example of a current block 20 is a prediction unit PU that is a data unit for predicting coding units having a tree structure. The coding units having a tree structure and the prediction unit are described below with reference to FIGS. 7 through 19. Although intra prediction of the prediction unit PU is disclosed hereinafter, intra prediction using another shape of block is also possible. The intra prediction may be performed on the current block 20 by referring to samples 28 and 23 in the left, the top, the lower left, and the upper right, which are adjacent to the current block 20. Accordingly, to determine a reference sample for the intra prediction of the current block 20, the already restored and available samples 28 and 23 may be searched for from among samples adjacent to the current block 20.

When intra prediction is performed on the current block 20 in the CIP mode, it is determined whether each sample having a size 22 of a minimum prediction unit that is a minimum block is available for the intra prediction. When intra prediction is performed on the current block 20 in a non-CIP mode, it is determined whether each sample having a size 21 of the prediction unit PU that is the current block 20 is available for the intra prediction.

Accordingly, according to whether intra prediction is performed on the current block 20 in the CIP mode or in the non-CIP mode, the availability of the samples 23 in the upper right of the current block 20 may vary.

When the current block 20 is in the non-CIP mode, even though the upper right samples 23 are restored in the intra mode, intra prediction referring to an external region 26 deviating from an image boundary 25 is impossible.

When the current block 20 is in the non-CIP mode, since the availability of all of the upper right samples 23 corresponding to the current block size 21 is determined, even though an internal region 24 inside the image boundary 25 includes already restored samples, the external region 26 deviating from the image boundary 25 cannot be referred to, and thus it is determined that all of the upper right samples 23 are samples that cannot be referred to. In this case, all of the upper right samples 23 are replaced by a sample 27 most adjacent to the upper right samples 23 from among the available samples.

When the current block 20 is in the CIP mode, availability may be determined for regions, e.g., the internal region 24 and the external region 26, corresponding to the minimum block size 22 from among the upper right samples 23. Even though the external region 26 deviating from the image boundary 25 is a region that cannot be referred to, the internal region 24 may be determined to be available samples. In this case, the external region 26 may be replaced by a sample 29 most adjacent to the external region 26 in the internal region 24.

Accordingly, according to whether the current block 20 is in the CIP mode or the non-CIP mode, the sizes 21 and 22 of the neighboring samples 22, 24, 26, and 28 used to determine availability for intra prediction of the current block 20 vary, and a padding method of the external region 26 deviating from the image boundary 25 also varies. Accordingly, according to whether the current block 20 is in the CIP mode or the non-CIP mode, an intra prediction method may vary, and thus an intra prediction result may also vary.

Figure 3:
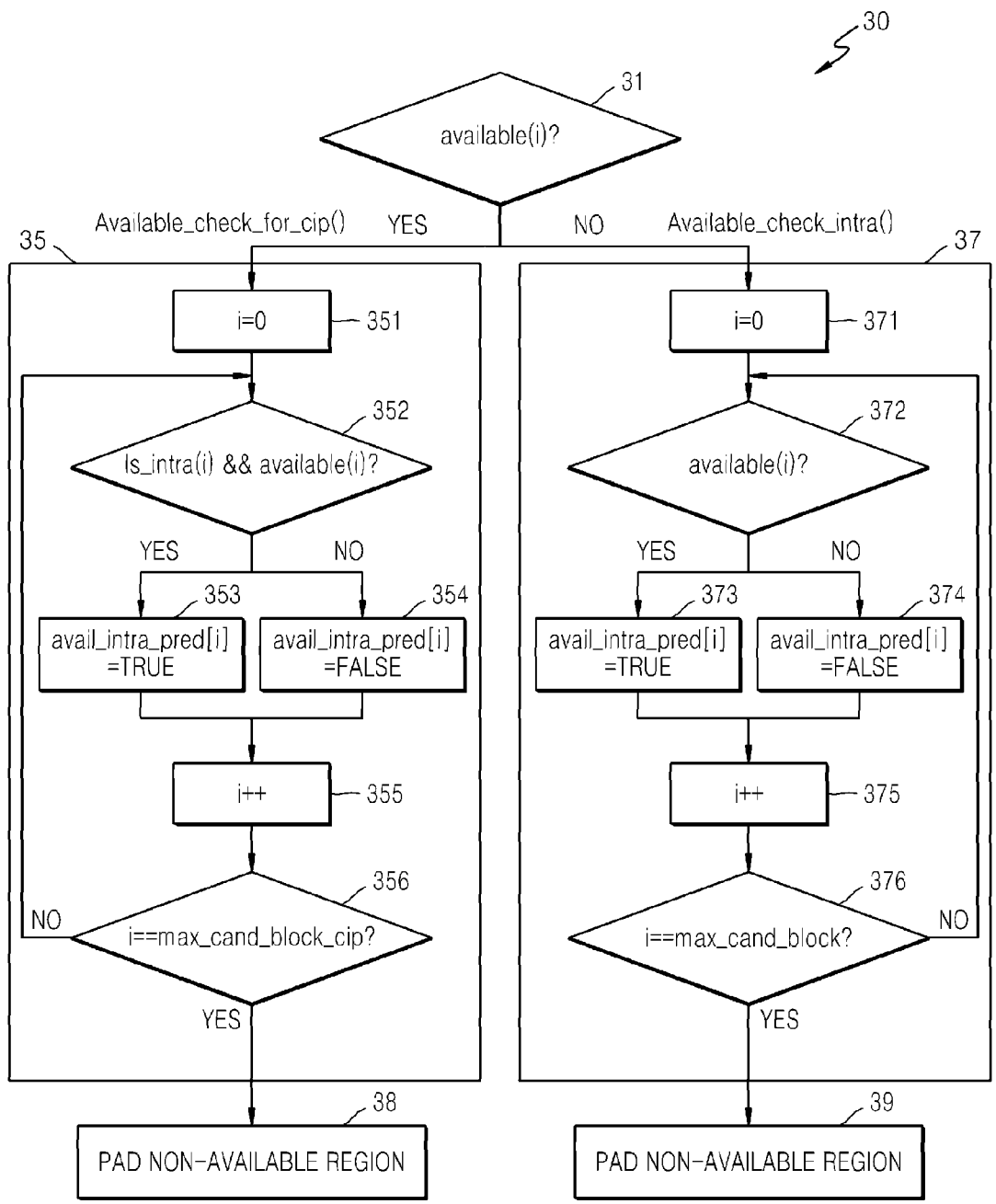
FIG. 3 is a flowchart illustrating a conventional process of determining availability according to the CIP mode.

FIG. 3 is a flowchart illustrating a conventional process 30 of determining availability according to the CIP mode.

In operation 31, it is determined whether an intra mode of a current block is the CIP mode. In video decoding, whether an intra mode of blocks included in a current image is the CIP mode may be determined based on 'Constrained_intra_pred' information parsed from an image header. For example, 'Constrained_intra_pred' information of a current picture may be parsed from a Picture Parameter Set (PPS). In video encoding, 'Constrained_intra_pred' information may be inserted into a PPS and transmitted. Whether intra blocks of a corresponding picture is predicted in the CIP mode may be determined based on 'Constrained_intra_pred' information.

The conventional process 30 proceeds to operation 35 ('Available_check_for_cip( )') to determine availability for the CIP mode if it is determined in operation 31 that the current block is in the CIP mode, and proceeds to operation 37 ('Available_check_intra( )') to determine availability for a non-CIP mode if it is determined in operation 31 that the current block is not in the CIP mode.

Hereinafter, in the flowcharts of FIGS. 3 and 4, an index i denotes an index of a neighboring block, 'Is_intra(i)' denotes an operation of determining whether the neighboring block having the index i is in the intra mode, and 'available(i)' denotes an operation of determining whether the neighboring block having the index i is a block restored prior to a current block. Also, 'avail_intra_pred[i]' is a variable indicating whether the neighboring block having the index i is an intra reference block for the current block. Also, 'max_cand_block_cip' and 'max_cand_block' denotes maximum numbers of candidate reference blocks for intra prediction in the CIP mode and intra prediction in the non-CIP mode, respectively.

The operations of determining availability according to the conventional process 30 will now be described in detail. In operation 35 ('Available_check_for_cip( )'), whether neighboring blocks are intra reference blocks is determined in an order of the index i. In operation 351, a neighboring block index is initialized (i=0), and in operation 352, it is determined whether a neighboring block is an intra block restored prior to the current block (Is_intra(i) && available (i)?).

If it is determined in operation 352 that the neighboring block i is an intra block restored prior to the current block, the neighboring block i is determined as an intra reference block for the current block in operation 353 (avail_intra_pred[i]=TRUE). If it is determined in operation 352 that the neighboring block i is not an intra block restored prior to the current block, the neighboring block i is not determined as an intra reference block for the current block in operation 354 (avail_intra_pred[i]=FALSE).

In operation 355, the block index i increases to determine availability of a next neighboring block. If the block index i is less than the maximum number of candidate reference blocks (max_cand_block_cip) for intra prediction according to the CIP mode in operation 356, operation 35 proceeds back to operation 352 to determine availability of the next neighboring block, and if the block index i is equal to max_cand_block_cip in operation 356, operation 35 ends.

Similarly, in operation 37 ('Available_check_intra( )'), an operation similar to operation 35 is performed. In operation 371, a neighboring block index is initialized (i=0), and in operation 372, it is determined whether a neighboring block i is a block restored prior to the current block (available(i)?). However, unlike operation 352, in operation 372, it is not determined whether the neighboring block i has been restored in the intra mode. Based on a result of operation 372, it is determined in operations 373 and 374 whether the neighboring block i is an intra reference block for the current block.

In operation 375, the block index i increases, and according to operation 376 to determine whether the block index i is less than the maximum number of candidate reference blocks (max_cand_block) for intra prediction, availability of a next neighboring block is determined again, or operation 37 ends.

Accordingly, even if operation 35 and operation 37 are actually almost the same, since similar operations are individually performed after it is determined whether a current block is in the CIP mode, the efficiency of a conventional intra prediction operation decreases.

Also, after completing operations 35 and 37, operations 38 and 39 for padding of a non-available region are performed, respectively.

As described above, when a certain region of a reference block deviates from an image boundary, a padding method of an external region of the image boundary in the reference block varies according to a case of the CIP mode and a case of the non-CIP mode. In other words, in operation 38, for intra prediction according to the CIP mode, the boundary external region may be padded with a sample most adjacent to the image boundary in a boundary internal region of the reference block. Meanwhile, in operation 39, samples of a first reference block of which even a certain region thereof deviates from the image boundary may be padded with samples of a second reference block most adjacent to the first reference block, wherein all of the samples of the second reference block are available.

Accordingly, since a padding method of reference blocks near an image boundary varies according to whether a current block is a block in the CIP mode, an intra prediction result may also vary.

Meanwhile, the intra prediction apparatus 10 may determine availability of neighboring blocks and an intra reference block regardless of the CIP mode. FIG. 4 is a flowchart illustrating a process (Available_check_intra( )) 40 of determining availability regardless of the CIP mode.

According to the process (Available_check_intra( )) 40, an intra reference block for a current block may start regardless of the CIP mode.

In operation 41, a neighboring block index is initialized (i=0), and in operation 42, it is determined whether a neighboring block i is a block restored prior to the current block (available(i)?).

If it is determined in operation 42 that the neighboring block i is not a block restored prior to the current block, the neighboring block i is not determined as an intra reference block for the current block in operation 45 (avail_intra_pred[i]=FALSE).

If it is determined in operation 42 that the neighboring block i is a block restored prior to the current block, whether the neighboring block i is not a block restored in the intra mode and whether the intra mode of the current block is also the CIP mode (!(Is_intra(i)) && Constrained_intra_pred?) are determined in operation 43.

If it is determined in operation 43 that the neighboring block i is not an intra block and the current block is in the CIP mode, it is determined in operation 45 that the neighboring block i is not an intra reference block for the current block (avail_intra_pred[i]=FALSE). In the other cases, e.g., if it is determined in operation 43 that the neighboring block i is an intra block but that the current block is not in the CIP mode, it is determined in operation 44 that the neighboring block i is an intra reference block for the current block (avail_intra_pred[i]=TRUE). In other words, when the current block is not in the CIP mode regardless of whether the neighboring block i is an intra block, the neighboring block i may be an intra reference block for the current block. Also, even when the neighboring block i is an intra block, even though the current block is not in the CIP mode, the neighboring block i may be determined as an intra reference block for the current block.

In operation 46, the block index i increases to determine availability of a next neighboring block. If the block index i is less than the maximum number of candidate reference blocks (max_cand_block_cip) for intra prediction according to the CIP mode in operation 47, the process 40 proceeds back to operation 42 to determine availability of the next neighboring block, and if the block index i is equal to max_cand_block_cip in operation 47, the process 40 ends.

Also, after completing the process 40, operation 49 for padding of a non-available region is performed. As described above, when a certain region of a reference block deviates from an image boundary, a sample most adjacent to the image boundary in a boundary internal region of the reference block may be padded to an external region of the image boundary.

Figure 4:
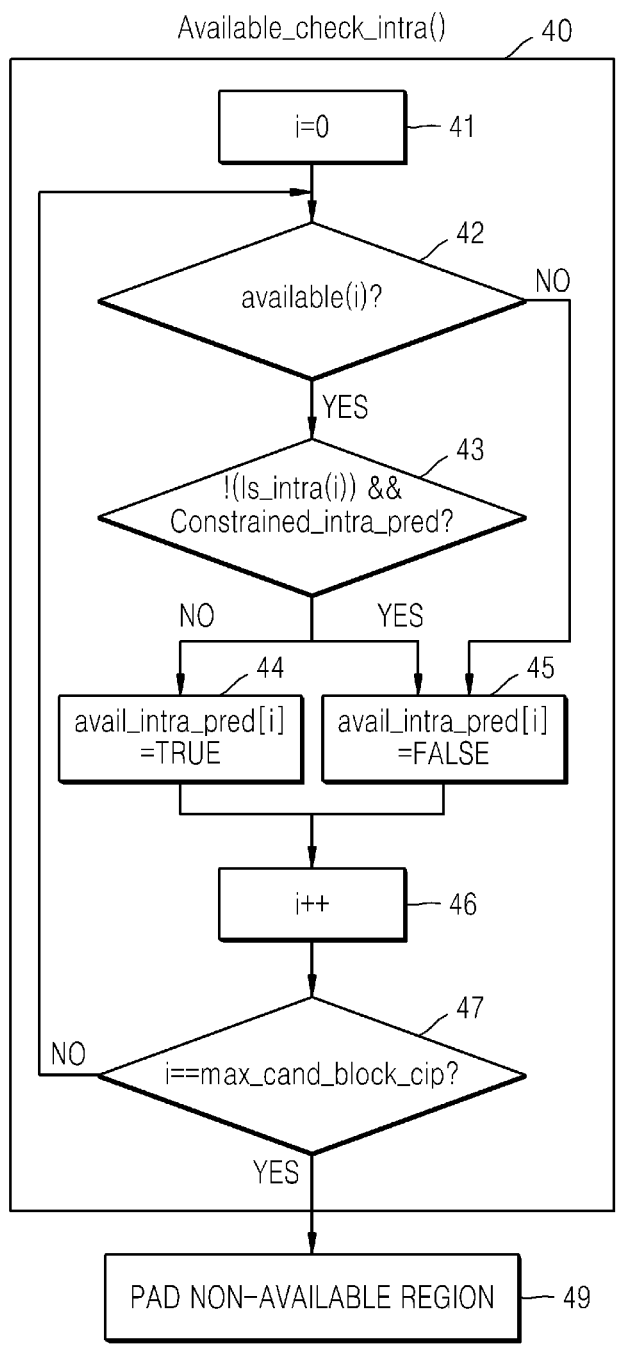
FIG. 4 is a flowchart illustrating a process of determining availability regardless of the CIP mode.

Accordingly, when the conventional process 30 is compared with the process 40 with reference to FIGS. 3 and 4, the intra prediction apparatus 10 determines whether neighboring blocks are blocks restored prior to a current block regardless of whether the current block is in the CIP mode, and thus a process of searching for an intra reference block from among the neighboring blocks does not have to be separated according to whether the current block is in the CIP mode. Accordingly, the intra prediction apparatus 10 may perform a unified process of determining availability of neighboring blocks and searching for an intra reference block in a case of the CIP mode and a case of the non-CIP mode even though intra prediction according to the CIP mode is selectively performed.

Also, even when a certain region of an intra reference block deviates from an image boundary, since a sample value of an available pixel adjacent to the image boundary is padded to the reference region deviating from the image boundary regardless of whether a current block is in the CIP mode, intra prediction results of the case where the current block is in the CIP mode and the case where the current block is not in the CIP mode may be the same.

Figure 5:
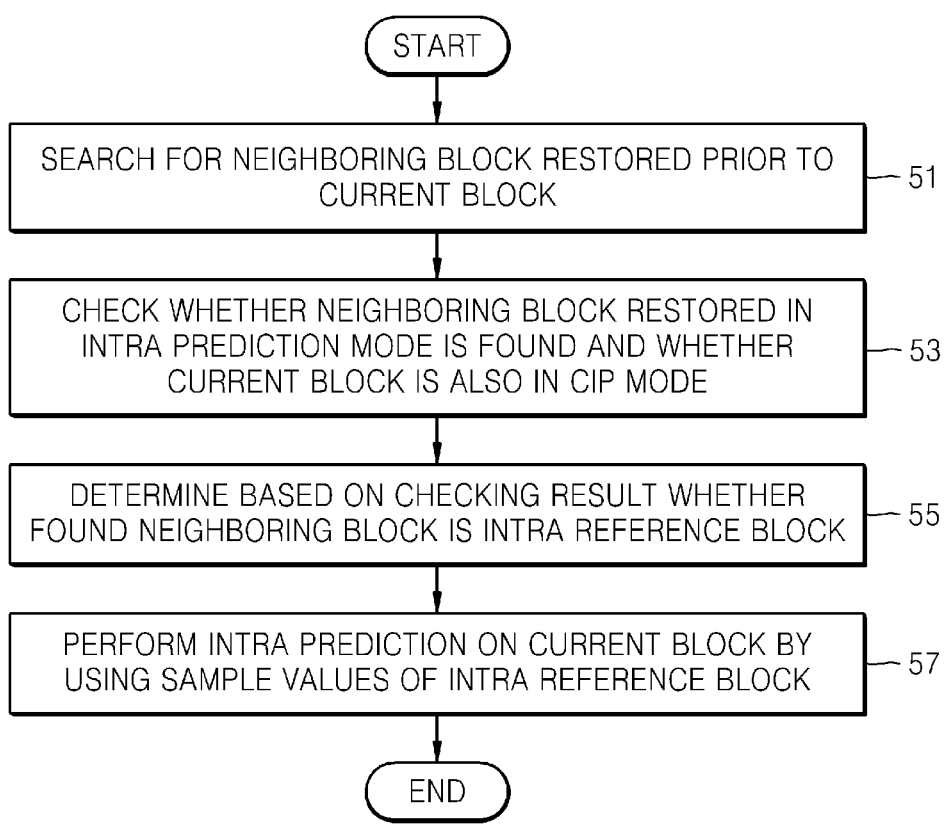
FIG. 5 is a flowchart illustrating an intra prediction method according to an exemplary embodiment.

FIG. 5 is a flowchart illustrating an intra prediction method according to an exemplary embodiment.

In operation 51, a neighboring block restored prior to a current block is searched for to perform intra prediction on the current block. In operation 53, whether the found neighboring block is a block restored in an intra mode and whether the current block is also in a CIP mode are determined.

Before it is determined whether an intra mode of the current block is the CIP mode, neighboring blocks restored prior to the current block are searched for in operation 51.

Whether each of the neighboring blocks found in operation 51 is an intra block and whether the current block is also in the CIP mode may be checked in operation 53.

In operation 55, it is determined based on a checking result of operation 52 whether the neighboring block found in operation 51 is a reference block for intra prediction of the current block.

In operation 57, the intra prediction operation is performed on the current block by using sample values of the reference block determined in operation 55 as an available block.

When the reference block deviates from a boundary of an image, a sample value of a pixel that is adjacent to the inside of the boundary from among pixels of the reference block may be padded to a region deviating from the boundary of the image. Specifically, regardless of whether the current block is in the CIP mode, the sample value of the pixel that is adjacent to the inside of the boundary from among the pixels of the reference block may be padded to the region deviating from the boundary of the image.

Figure 6A:
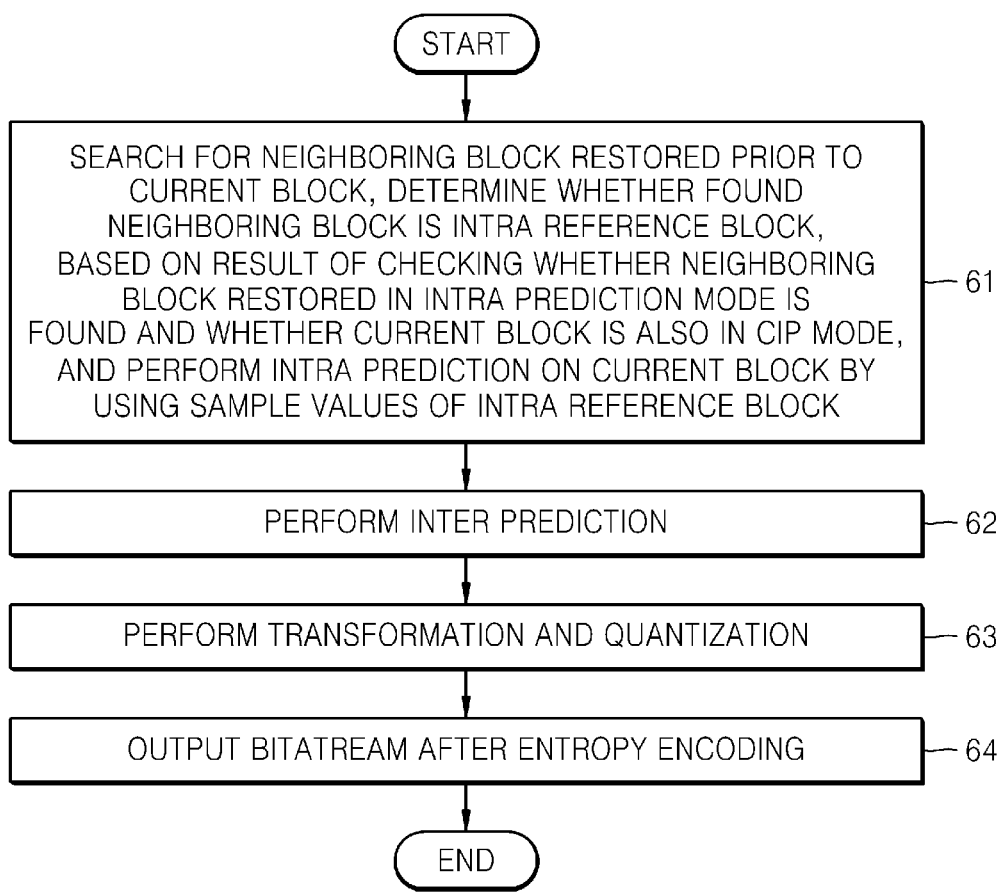
FIG. 6A is a flowchart illustrating a video encoding method including intra prediction, according to an exemplary embodiment.

FIG. 6A is a flowchart illustrating a video encoding method including intra prediction, according to an exemplary embodiment.

In operation 61, a neighboring block restored prior to a current block is searched for from among blocks of a video to perform intra prediction on the current block according to the intra prediction method according to an exemplary embodiment.

Also, whether the found neighboring block is an intra block restored in an intra mode and whether the current block is also in the CIP mode are checked. Also, based on a result of checking whether the found neighboring block is an intra block restored prior to the current block and whether the current block is also in the CIP mode, it is determined whether the found neighboring block is an intra reference block for the current block. Also, intra prediction is performed on the current block by using sample values of the intra reference block.

In operation 62, residual information is generated by performing inter prediction on blocks in an inter prediction mode from among the blocks of the video. In operation 63, a quantized transformation coefficient is generated by performing transformation and quantization on a result of performing the intra prediction or the inter prediction. In operation 65, a bitstream generated by performing entropy decoding on samples including the quantized transformation coefficient generated in operation 63 is output.

Specifically, in the intra prediction performed in operation 61, neighboring blocks restored prior to the current block may be searched for before it is determined whether a prediction mode of the current block is an intra mode of the CIP mode. It may be checked whether each of the neighboring blocks restored prior to the current block is an intra block while the current block is in the CIP mode.

Also, in the intra prediction performed in operation 61, when a reference block deviates from a boundary of an image regardless of whether an intra mode of the current block is the CIP mode, a sample value of a pixel adjacent to the inside of the boundary from among pixels of the reference block may be padded to an external region of the boundary of the image to be used as a reference sample.

A video encoding apparatus for performing the video encoding method according to the exemplary embodiment of FIG. 6A may include the intra prediction apparatus 10. The video encoding apparatus including the intra prediction apparatus 10 may generate samples by performing intra prediction, inter prediction, transformation, and quantization of each image block and output a bitstream by performing entropy encoding on the generated samples. The video encoding apparatus including the intra prediction apparatus 10 may perform a video encoding operation including transformation by linking the intra prediction apparatus 10 to a video encoding processor included in the video encoding apparatus or an external video encoding processor to output a video encoding result. The video encoding processor included in the video encoding apparatus may also be implemented to include not only a separate processor but also the video encoding apparatus, a Central Processing Unit (CPU), or a graphic computing apparatus including an encoding processing module performs a basic video encoding operation.

Figure 6B:
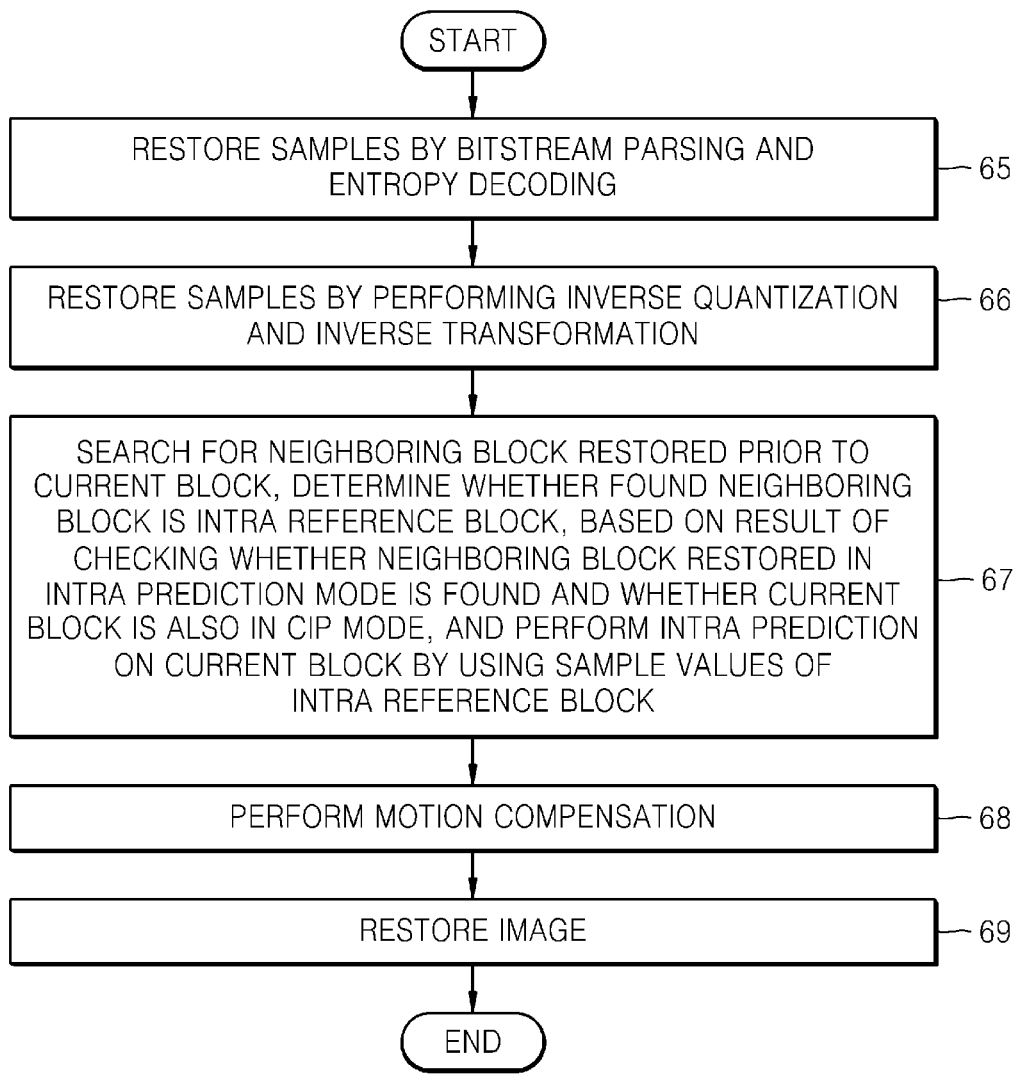
FIG. 6B is a flowchart illustrating a video decoding method including intra prediction, according to an exemplary embodiment.

FIG. 6B is a flowchart illustrating a video decoding method including intra prediction, according to an exemplary embodiment.

In operation 65, samples are restored by performing entropy encoding on a bit string parsed from a received bitstream. In operation 66, samples are restored by performing inverse quantization and inverse transformation on a quantized transformation coefficient among the samples. In operation 67, intra prediction is performed on samples in an intra mode, and in operation 68, motion compensation is performed on samples in an inter mode. In operation 69, an image is restored by using blocks restored by the inter prediction of operation 68 or the intra prediction of operation 69.

In operation 67, a neighboring block restored prior to a current block is searched for to perform the intra prediction on the current block in the intra mode.

Also, whether the found neighboring block is an intra block restored in an intra mode and whether the current block is also in the CIP mode are checked. Also, based on a result of checking whether the found neighboring block is an intra block restored prior to the current block and whether the current block is also in the CIP mode, it is determined whether the found neighboring block is an intra reference block for the current block. Also, intra prediction is performed on the current block by using sample values of the intra reference block.

In operation 67, based on CIP mode information of a current image parsed from the bitstream in operation 65, whether a prediction mode of the current block is an intra mode of the CIP mode may be determined. Also, before it is determined whether the prediction mode of the current block is the intra mode of the CIP mode, neighboring blocks restored prior to the current block may be searched for. Also, it may be checked whether each of the neighboring blocks restored prior to the current block is an intra block while the current block is in the CIP mode.

Also, in the intra prediction of operation 67, when a reference block deviates from a boundary of an image regardless of whether an intra mode of the current block is the CIP mode, a sample value of a pixel that is adjacent to the inside of the boundary from among pixels of the reference block may be padded to an external region of the boundary of the image.

A video decoding apparatus for performing the video decoding method according to the exemplary embodiment of FIG. 6B may include the intra prediction apparatus 10. The video decoding apparatus including the intra prediction apparatus 10 may restore samples by parsing encoded samples from a bitstream and performing inverse quantization, inverse transformation, intra prediction, and motion compensation of each image block. The video decoding apparatus may perform a video decoding operation including inverse transformation and estimation and compensation by linking the intra prediction apparatus 10 to a video decoding processor included in the video decoding apparatus or an external video decoding processor to output a video decoding result. The video decoding processor included in the video decoding apparatus may also be implemented to include not only a separate processor but also the video decoding apparatus, a CPU, or a graphic computing apparatus including an encoding processing module which performs a basic video decoding operation.

In the intra prediction apparatus 10, blocks which video data is split into may be split into coding units having a tree structure, and prediction units may be used for intra prediction of a coding unit, as described above. Hereinafter, a video encoding method and apparatus and a video decoding method and apparatus based on coding units having a tree structure and transformation units according to exemplary embodiments will now be disclosed with reference to FIGS. 7 through 19.

Figure 7:
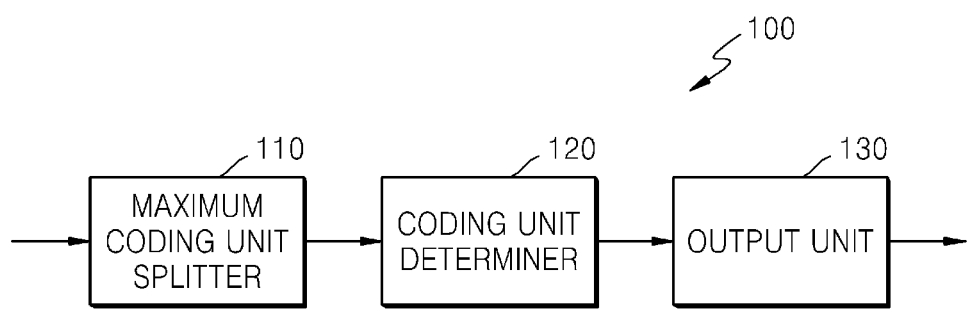
FIG. 7 is a block diagram of an apparatus for encoding a video based on coding units having a tree structure, according to an exemplary embodiment.

FIG. 7 is a block diagram of a video encoding apparatus 100 based on coding units having a tree structure, according to an exemplary embodiment.

The video encoding apparatus 100, which performs video prediction based on coding units having a tree structure, according to an exemplary embodiment, includes a maximum coding unit splitter 110, a coding unit determiner 120, and an output unit 130. Hereinafter, for convenience of description, the video encoding apparatus 100, which performs video prediction based on coding units having a tree structure, according to an exemplary embodiment, is condensed to the video encoding apparatus 100.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost coding unit. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded result according to the at least one split region. In other words, the coding unit determiner 120 determines a coded depth by encoding the image data in the deeper coding units according to depths, according to the maximum coding unit of the current picture, and selects a depth having the least encoding error. The determined coded depth and the image data according to the maximum coding units are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each of the coding units, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 are provided, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in at least one maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, e.g., based on a coding unit that is no longer split. Hereinafter, the coding unit that is no longer split and becomes a basis unit for prediction encoding will also be referred to as a 'prediction unit'. A partition obtained by splitting the prediction unit may include a prediction unit or a data unit obtained by splitting at least one of a height and a width of the prediction unit. The partition may be a data unit obtained by splitting a prediction unit in a coding unit, and the prediction unit may be a partition having the same size as the coding unit.

For example, when a coding unit of 2N×2N (where N is a positive integer) is no longer split, the coding unit becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for the intra mode and a data unit for the inter mode.

Similarly to the coding unit having a tree structure according to an exemplary embodiment, the transformation unit in the coding unit may be recursively split into smaller sized transformation units. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is N/2×N/2. For example, the transformation unit may be set according to a tree structure according to a transformation depth.

Encoding information according to a coded depth requires not only information about the coded depth, but also information related to prediction encoding and transformation. Accordingly, the coding unit determiner 120 not only determines a coded depth having a least encoding error, but also determines a partition type for splitting a prediction unit into partitions, a prediction mode according to prediction units, and a size of a transformation unit for transformation.

Coding units according to a tree structure in a maximum coding unit and a method of determining a prediction unit/partition and a transformation unit, according to exemplary embodiments, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 (e.g., outputter) outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depths may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded in the coding unit of the current depth, and thus the split information of the current depth may be defined not to split the current coding unit into coding units of a lower depth. Alternatively, if the current depth of the current coding unit is not the coded depth, the encoding is performed on the coding unit of the lower depth, and thus the split information of the current depth may be defined to split the current coding unit into the coding units of the lower depth.

If the current depth is not the coded depth, encoding is performed on the coding unit split to the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically divided according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost coded depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or Group of pictures (GOPs), and information about a maximum depth may be inserted into a header, a Sequence Parameter Set (SPS) or a Picture Parameter Set (PPS) of a bitstream.

Also, information about a maximum size of the transformation unit and information about a minimum size of the transformation unit, which are allowed for a current video, may be output using the header, the SPS, or the PPS of the bitstream. The output unit 130 may encode and output the reference information related to prediction, the prediction information, the single-direction prediction information, the slice-type information including the fourth slice type, and so forth, which have been described with reference to FIGS. 1 through 6.

In the simplest example of the video encoding apparatus 100, the deeper coding unit may be a coding unit obtained by dividing each of a height and a width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum 4 coding units of the lower depth having the size of N×N.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformation schemes, an optimum encoding mode may be determined considering image characteristics of the coding unit of various image sizes.

Thus, if an image having high resolution or a large data amount is encoded in a conventional macroblock unit, a number of macroblocks per picture excessively increases. Accordingly, a number of pieces of compressed information generated for each macroblock increases, and thus it is difficult to transmit the compressed information, and data compression efficiency decreases. However, by using the video encoding apparatus 100, image compression efficiency may be increased since a coding unit is adjusted considering characteristics of an image while increasing a maximum size of the coding unit by considering a size of the image.

The video encoding apparatus 100 of FIG. 7 may perform an operation of the intra prediction apparatus 10 described above with reference to FIG. 1.

The coding unit determiner 120 may perform an operation of the intra prediction apparatus 10. The coding unit determiner 120 may determine a prediction unit for intra prediction and perform the intra prediction in a prediction unit, for the coding units having a tree structure in each maximum coding unit.

Specifically, in the intra prediction, before it is determined whether a prediction mode of a current prediction unit is an intra mode of a CIP mode, neighboring data units (a minimum unit, a prediction unit, a coding unit, etc.) restored before the current prediction unit may be searched. That is, it may be determined whether a current block is in the CIP mode while each of the neighboring data units restored before the current prediction unit is in the intra mode.

Also, in the intra prediction, when a reference data unit deviates from a boundary of an image regardless of whether the current prediction unit is the CIP mode, an external region of a boundary of a picture may be padded with a sample value of a pixel adjacent to the inside of the boundary from among pixels of the reference data unit. The intra prediction of the current prediction unit may be performed by referring to this padded region.

The output unit 130 may output samples, which are generated by encoding differential data generated as a result of the intra prediction, in bitstreams. For example, samples, such as a quantized transformation coefficient of the differential data and intra mode information, may be output.

Also, the output unit 130 may output a PPS into which CIP information indicating a CIP mode or not is inserted according to pictures.

Figure 8:
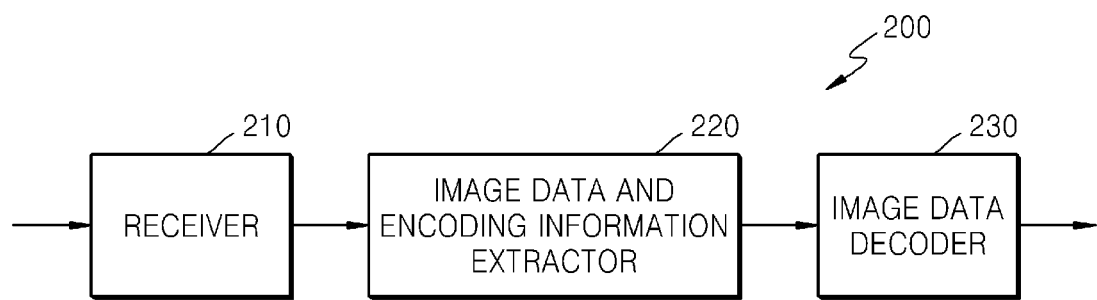
FIG. 8 is a block diagram of an apparatus for decoding a video based on coding units having a tree structure, according to an exemplary embodiment.

FIG. 8 is a block diagram of a video decoding apparatus 200 based on coding units having a tree structure, according to an exemplary embodiment.

The video decoding apparatus 200, which performs video prediction based on coding units having a tree structure, according to an exemplary embodiment, includes a receiver 210, an image data and encoding information extractor 220, and an image data decoder 230. Hereinafter, for convenience of description, the video decoding apparatus 200, which performs video prediction based on coding units having a tree structure, according to an exemplary embodiment, is condensed to the video decoding apparatus 200.

Definitions of various terms, such as a coding unit, a depth, a prediction unit, a transformation unit, and information about various encoding modes, for various decoding operations of the video decoding apparatus 200, are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header of the current picture, an SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding units so that the image data decoder 230 decodes the image data for each maximum coding unit.

The information about the coded depth and the encoding mode according to the maximum coding units may be set for information about at least one coded depth, and the information about the encoding mode according to coded depths may include information about a partition type of a corresponding coding unit, about a prediction mode, and a size of a transformation unit. Also, splitting information according to depths may be extracted as the information about the coded depth.

The information about the coded depth and the encoding mode according to each maximum coding unit, which is extracted by the image data and encoding information extractor 220, is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction operation including intra prediction and motion compensation, and an inverse transformation operation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation based on a transformation unit in each coding unit by reading the information about the transformation unit having the tree structure according to the coding units, so as to perform the inverse transformation according to maximum coding units. A pixel value of a coding unit in a spatial domain may be restored by performing the inverse transformation.

The image data decoder 230 may determine a coded depth of a current maximum coding unit by using split information according to depths. If the split information indicates that image data is no longer split in the current depth, the current depth is a coded depth. Accordingly, the image data decoder 230 may decode image data of a coding unit corresponding to current depth in the current maximum coding unit by using the information about the partition type of the prediction unit, the prediction mode, and the size of the transformation unit.

In other words, data units containing the encoding information including the same split information may be gathered by observing the encoding information set for the predetermined data unit from among the coding unit, the prediction unit, and the minimum unit, and the gathered data units may be considered to be one data unit to be decoded by the image data decoder 230 in the same encoding mode. Similarly, image data of a current coding unit may be decoded by acquiring the information about the encoding mode for the determined coding units.

The video decoding apparatus 200 of FIG. 8 may also perform an operation of the intra prediction apparatus 10 described above with reference to FIG. 1.

The image data and encoding information extractor 220 may restore samples generated as an encoding result from a bitstream. For example, samples, such as a quantized transformation coefficient of differential data and intra mode information, which are generated by prediction, may be restored. Also, the image data and encoding information extractor 220 may restore a CIP mode according to pictures based on CIP information parsed from the PPS.

The image data decoder 230 may perform an operation of the intra prediction apparatus 10. The image data decoder 230 may determine a prediction unit for intra prediction and perform the intra prediction in each prediction unit, for the coding units having a tree structure in each maximum coding unit.

Specifically, in the intra prediction, before it is determined whether a prediction mode of a current prediction unit is an intra mode of a CIP mode, neighboring data units (for example, a minimum unit, a prediction unit, a coding unit, etc.) restored before the current prediction unit may be searched. That is, it may be determined whether a current block is in the CIP mode while each of the neighboring data units restored before the current prediction unit is in the intra mode.

Also, in the intra prediction, when a reference data unit deviates from a boundary of an image regardless of whether the current prediction unit is the CIP mode, an external region of a boundary of a picture may be padded with a sample value of a pixel adjacent to the inside of the boundary from among pixels of the reference data unit. The intra prediction of the current prediction unit may be performed by referring to this padded region.

The video decoding apparatus 200 may obtain information about a coding unit that generates the minimum encoding error when encoding is recursively performed for each maximum coding unit, and may use the information to decode the current picture. In other words, the encoded image data of the coding units having the tree structure determined to be the optimum coding units in each maximum coding unit may be decoded.

Accordingly, even if image data has a high resolution and a large amount of data, the image data may be efficiently decoded and restored based on a size of a coding unit and an encoding mode, which are adaptively determined according to characteristics of the image data, by using information about an optimum encoding mode received from an encoder.

Figure 9:
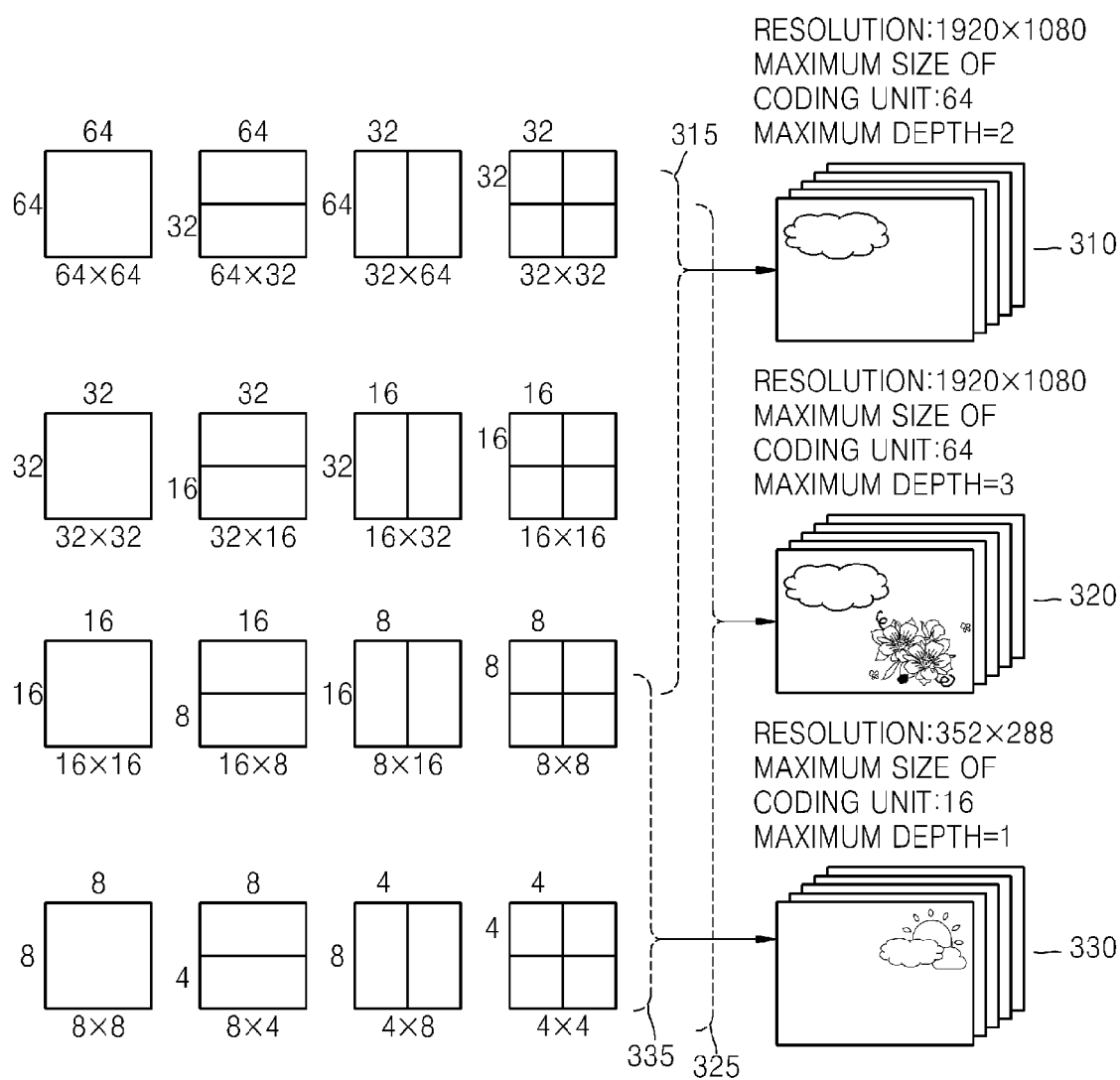
FIG. 9 is a diagram for describing a concept of coding units according to an exemplary embodiment.

FIG. 9 is a diagram for describing a concept of coding units according to an exemplary embodiment.

A size of a coding unit may be expressed in width×height, and may be, for example, 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a maximum coding unit to a minimum coding unit.

If a resolution is high or a data amount is large, a maximum size of a coding unit may be large enough so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be more precisely expressed.

Figure 10:
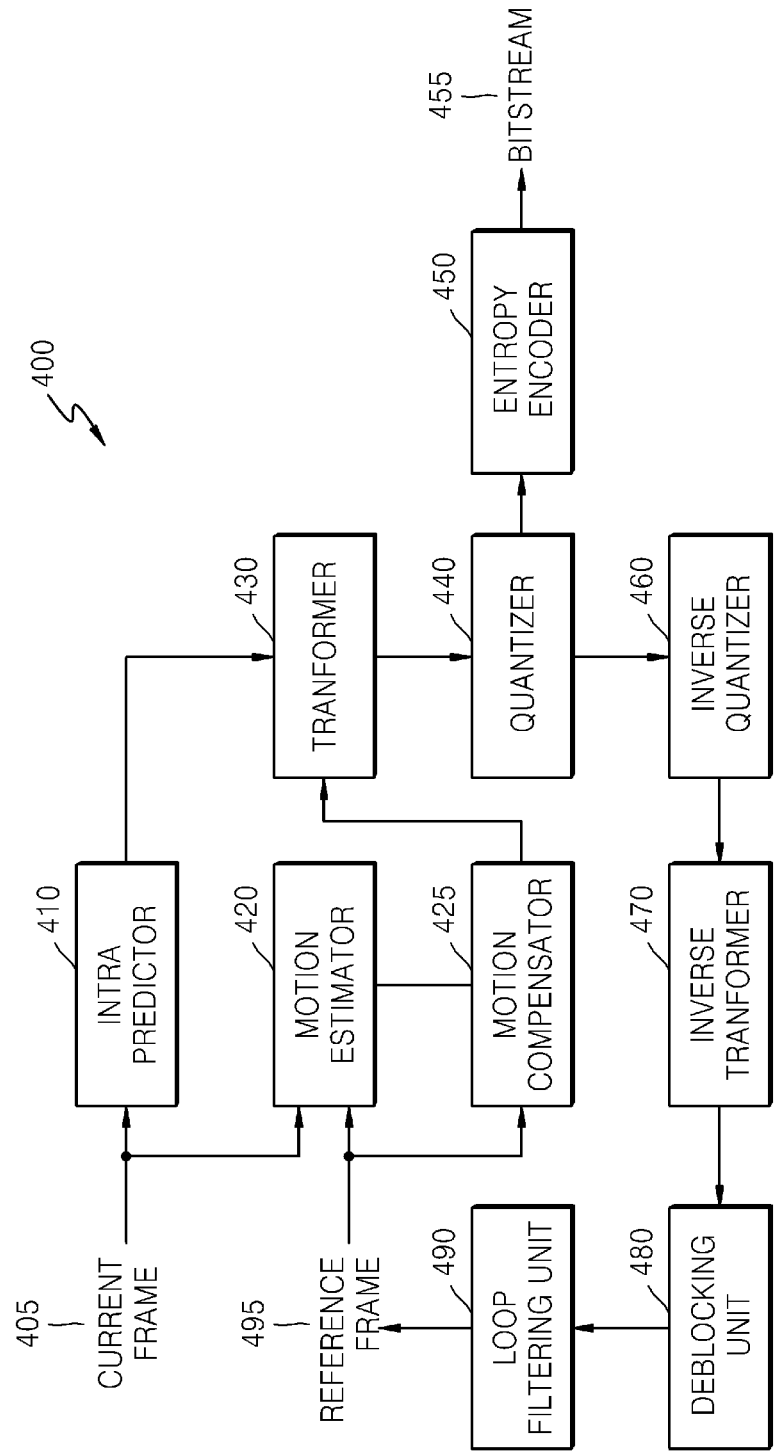
FIG. 10 is a block diagram of an image encoder based on coding units according to an exemplary embodiment.

FIG. 10 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, e.g., the intra predictor 410, the motion estimator 420, the motion compensator 425, the transformer 430, the quantizer 440, the entropy encoder 450, the inverse quantizer 460, the inverse transformer 470, the deblocking unit 480 (e.g., deblocker), and the loop filtering unit 490 (e.g., loop filter), perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Specifically, the intra predictor 410 may search for neighboring data units restored before a current prediction unit before it is determined whether a prediction mode of the current prediction unit is an intra mode of a CIP mode. That is, it may be determined whether a current block is in the CIP mode while each of the neighboring data units restored before the current prediction unit is in the intra mode. Also, when a reference data unit deviates from a boundary of an image, an external region of a boundary of a picture may be padded with a sample value of a pixel adjacent to the inside of the boundary from among pixels of the reference data unit regardless of whether the current prediction unit is the CIP mode, and the padded samples may be referred to for the intra prediction of the current prediction unit.

Figure 11:
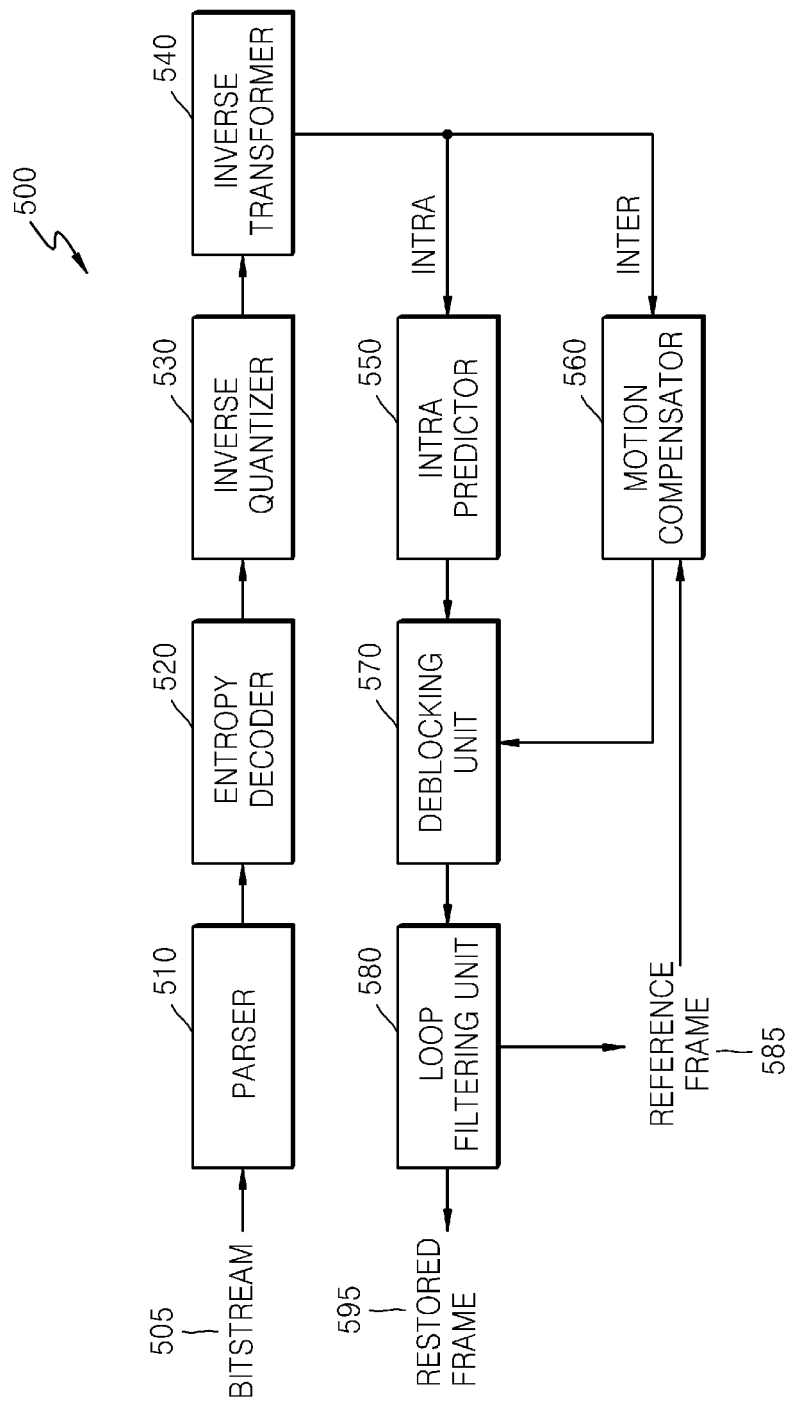
FIG. 11 is a block diagram of an image decoder based on coding units according to an exemplary embodiment.

FIG. 11 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 (e.g., deblocker) and a loop filtering unit 580 (e.g., loop filter). Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be implemented in the video decoding apparatus 200, each of the elements of the image decoder 500, e.g., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra predictor 550 and the motion compensator 560 determine partitions and a prediction mode for each of the coding units having a tree structure, and the inverse transformer 540 determines a size of a transformation unit for each coding unit.

Specifically, the intra predictor 550 may search for neighboring data units restored before a current prediction unit before it is determined whether a prediction mode of the current prediction unit is an intra mode of a CIP mode. That is, it may be determined whether a current block is in the CIP mode while each of the neighboring data units restored before the current prediction unit is in the intra mode. Also, when a reference data unit deviates from a boundary of an image, an external region of a boundary of a picture may be padded with a sample value of a pixel adjacent to the inside of the boundary from among pixels of the reference data unit regardless of whether the current prediction unit is the CIP mode, and the padded samples may be referred to for the intra prediction of the current prediction unit.

Figure 12:
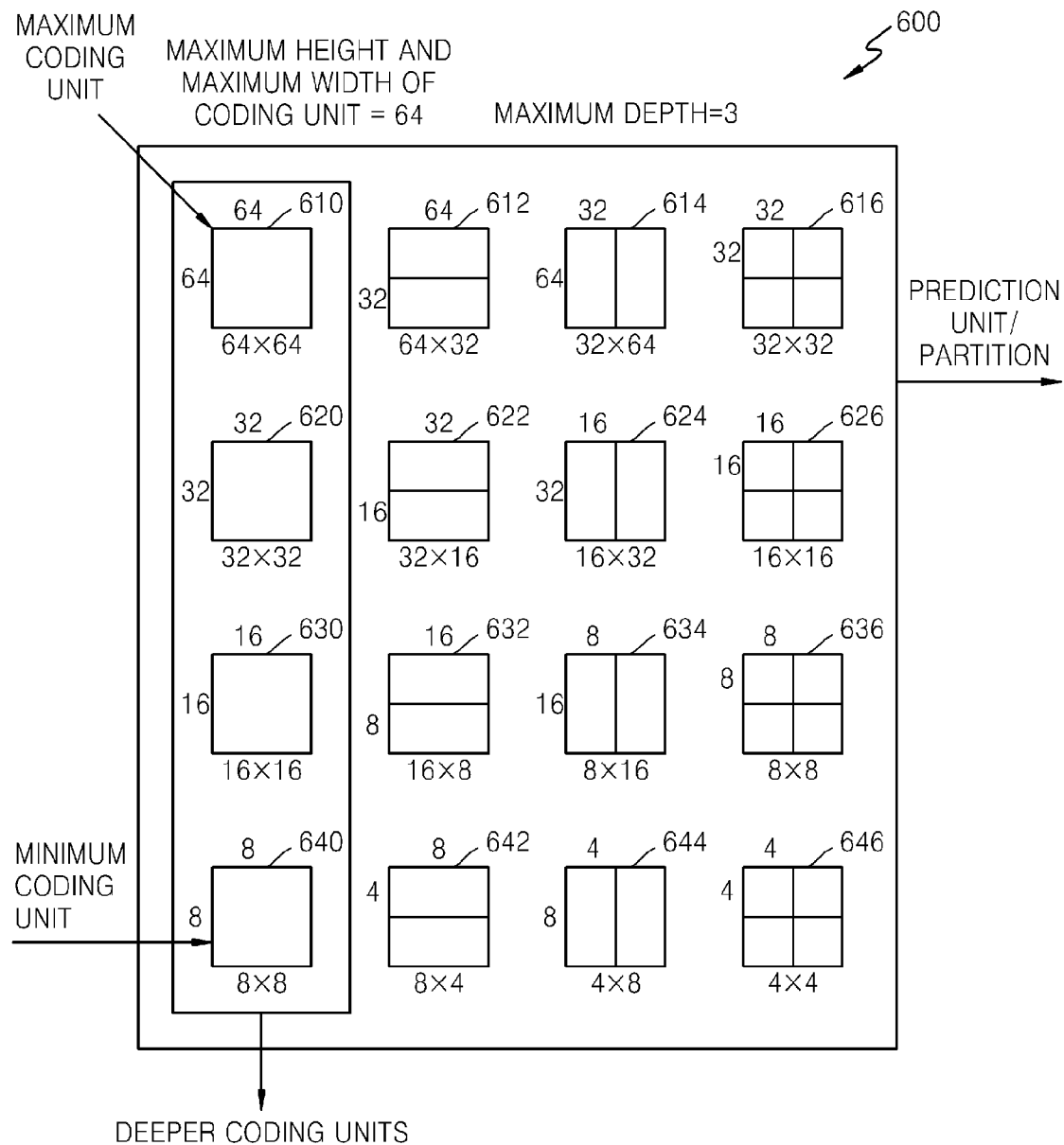
FIG. 12 is a diagram illustrating deeper coding units according to depths, and partitions according to an exemplary embodiment.

FIG. 12 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of an image, or may be differently set by a user. Sizes of deeper coding units according to depths may be determined according to the predetermined maximum size of the coding unit.

In a hierarchical structure 600 of coding units according to an exemplary embodiment, the maximum height and the maximum width of the coding units are each 64, and the maximum depth is 3. The maximum depth indicates a total number of splits from a maximum coding unit to a minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is the maximum coding unit in the hierarchical structure 600, wherein a depth is 0 and a size, e.g., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are provided. The coding unit 640 having the size of 8×8 and the depth of 3 is the minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, e.g., a partition 610 having a size of 64×64, partitions 612 having a size of 64×32, partitions 614 having a size of 32×64, or partitions 616 having the size of 32×32.

Similarly, a prediction unit of the coding unit 620 having the size of 32×32 and the depth of 1 may be split into partitions included in the coding unit 620, e.g., a partition 620 having the size of 32×32, partitions 622 having a size of 32×16, partitions 624 having a size of 16×32, and partitions 626 having the size of 16×16.

Similarly, a prediction unit of the coding unit 630 having the size of 16×16 and the depth of 2 may be split into partitions included in the coding unit 630, e.g., a partition 630 having the size of 16×16, partitions 632 having a size of 16×8, partitions 634 having a size of 8×16, and partitions 636 having the size of 8×8.

Similarly, a prediction unit of the coding unit 640 having the size of 8×8 and the depth of 3 may be split into partitions included in the coding unit 640, e.g., a partition 640 having the size of 8×8, partitions 642 having a size of 8×4, partitions 644 having a size of 4×8, and partitions 646 having the size of 4×4.

In order to determine a coded depth of the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for depths, a representative encoding error that is a least (smallest) encoding error for a corresponding depth may be selected by performing encoding for each prediction unit in the coding units corresponding to each depth, along the horizontal axis of the hierarchical structure 600. Alternatively, the minimum encoding error may be searched for by comparing the representative encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 13:
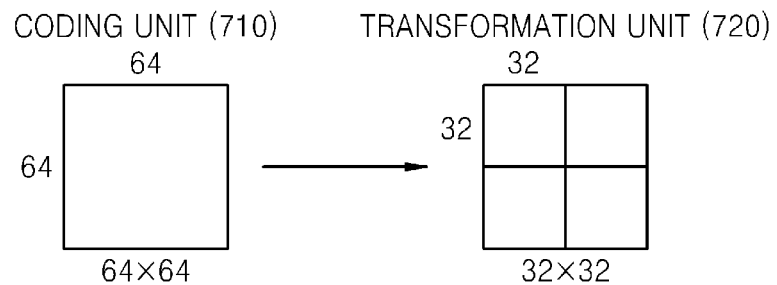
FIG. 13 is a diagram for describing a relationship between a coding unit and transformation units, according to an exemplary embodiment.

FIG. 13 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the sizes of 32×32, 16×16, 8×8, and 4×4, which are smaller than 64×64, and then a transformation unit having the least coding error may be selected.

Figure 14:
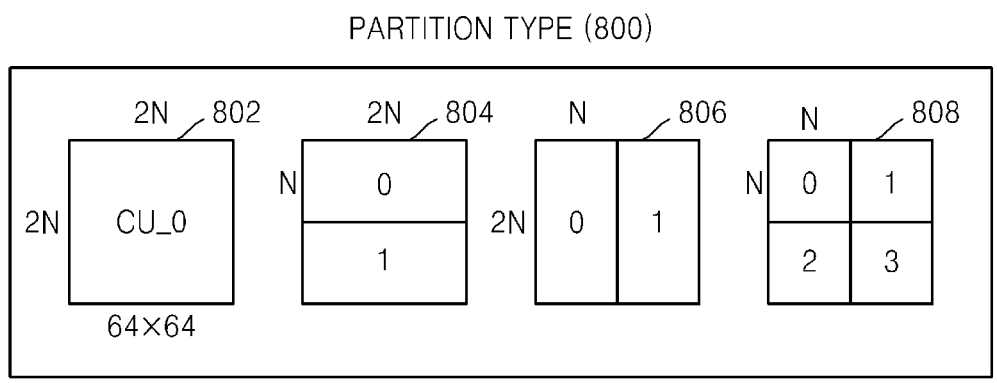
FIG. 14 is a diagram for describing encoding information according to depths, according to an exemplary embodiment.
Figure 14:
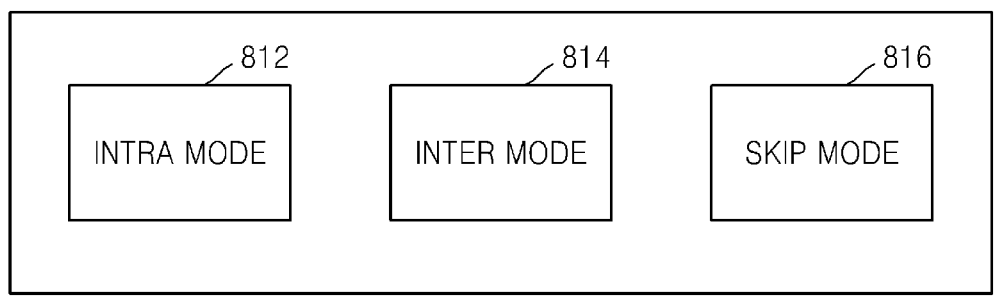
Figure 14:
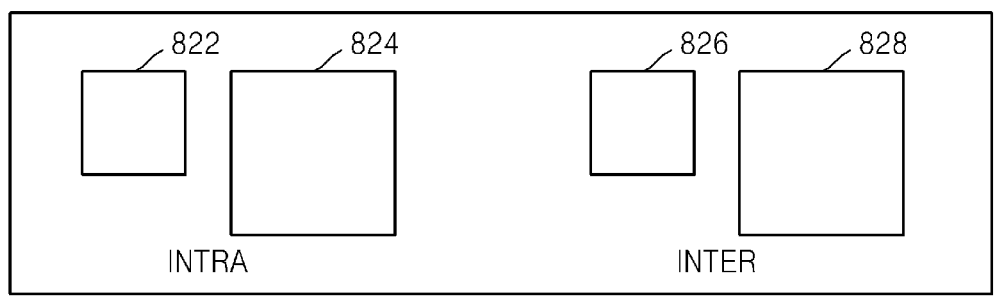

FIG. 14 is a diagram for describing encoding information according to depths, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding of the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type of the current coding unit is set to indicate one of the partition 802 having a size of 2N×2N, the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 15:
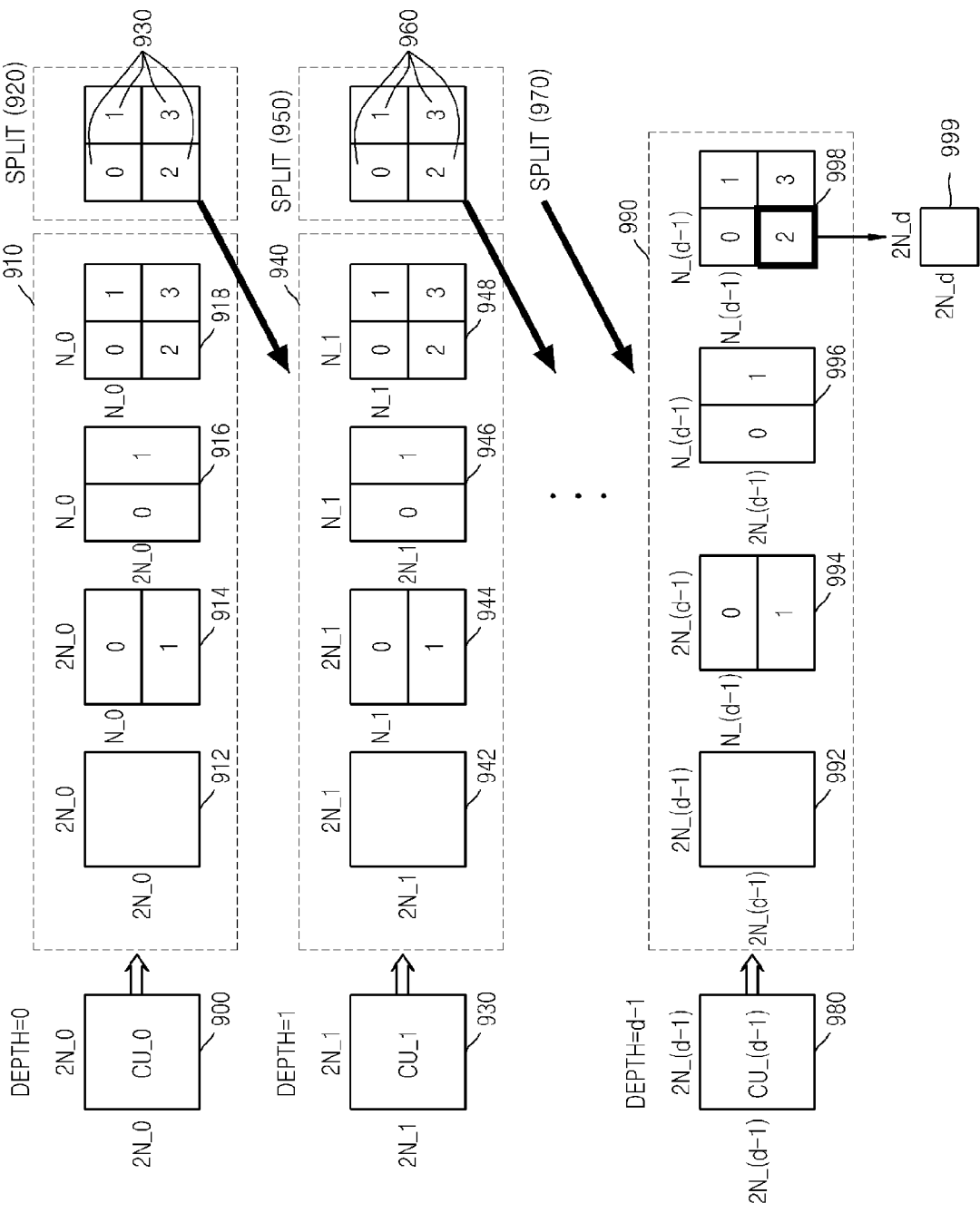
FIG. 15 is a diagram of deeper coding units according to depths, according to an exemplary embodiment.

FIG. 15 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 15 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is the smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding of the coding unit 930 having a depth of 1 and a size of 2N_1× 2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, deeper coding units according to each depth may be set up to when a depth becomes d−1, and split information may be set up to when a depth becomes d−2. In other words, when encoding is performed up to when the depth is d−1 after a coding unit corresponding to a depth of d−2 is split in operation 970, a prediction unit 990 for prediction encoding of a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for a current maximum coding unit 900 is determined to be d−1 and a partition type of the current maximum coding unit 900 may be determined to be N_(d−1)×N_(d−1). Also, since the maximum depth is d, split information for a coding unit 952 having a lowermost depth of d−1 is not set.

A data unit 999 may be a 'minimum unit' for the current maximum coding unit. A minimum unit according to an exemplary embodiment may be a rectangular data unit obtained by splitting a minimum coding unit having a lowermost coded depth by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0 through d, and a depth having the least encoding error may be determined as a coded depth. The coded depth, the partition type of the prediction unit, and the prediction mode may be encoded and transmitted as information about an encoding mode.

Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the coding unit (partition) 912. The video decoding apparatus 200 may determine a depth, in which split information is 0, as a coded depth by using split information according to depths, and use information about an encoding mode of the corresponding depth for decoding.

Figure 16:
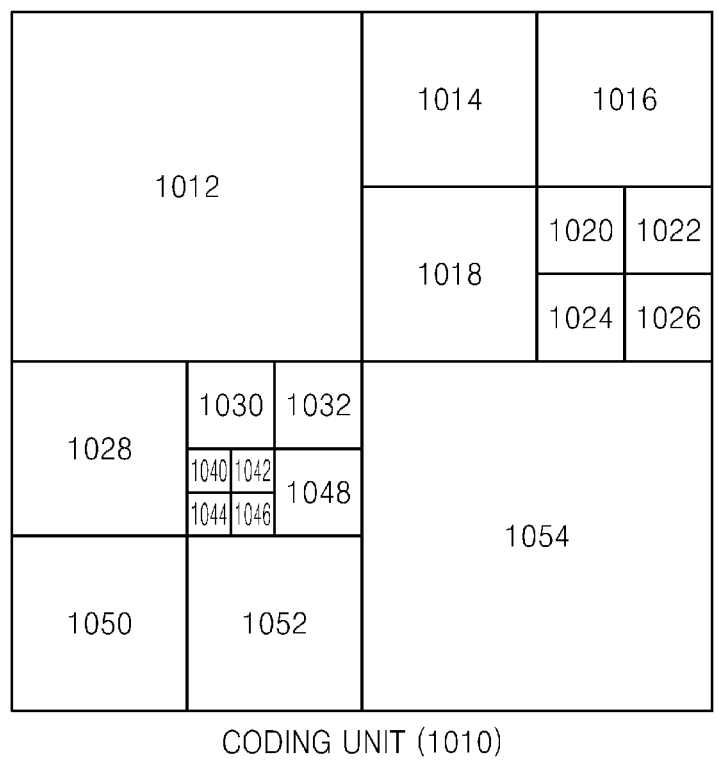
FIGS. 16 through 18 are diagrams for describing a relationship between coding units, prediction units, and transformation units, according to an exemplary embodiment.
Figure 17:
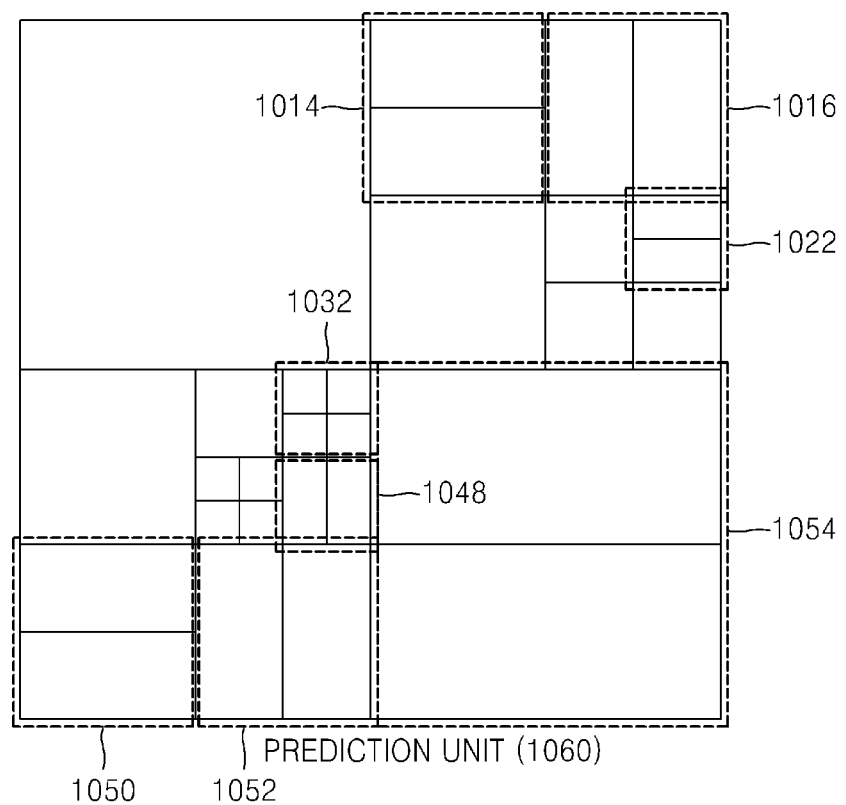
Figure 18:
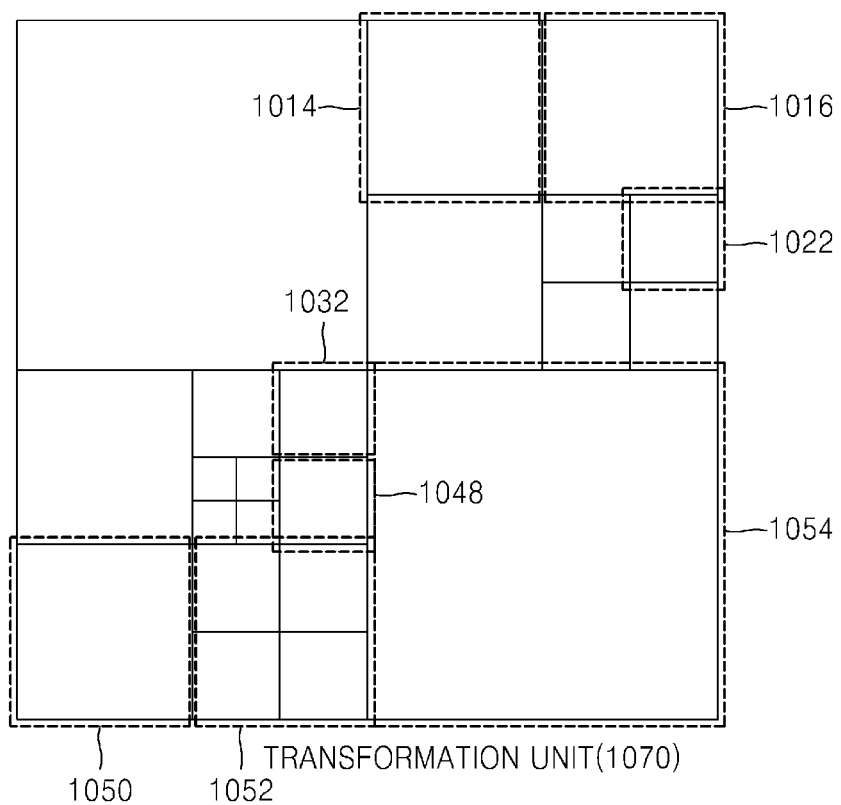

FIGS. 16 through 18 are diagrams for describing a relationship between coding units 1010, prediction units 1060, and transformation units 1070, according to an exemplary embodiment.

The coding units 1010 are coding units corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units (partitions) 1014, 1016, 1022, 1032, 1048, 1050, 1052, and 1054 are split. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of the coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | Split Information 1 |
| --- | --- | --- | --- | --- |
| Prediction Mode | Partition Type | | Size of Transformation Unit | | Repeatedly Encode Coding Units |
| Intra | Symmetrical | Asymmetrical | Split | Split | |

TABLE 1-continued

| | Split Information 0 (Encoding on Coding Unit having Size of 2N × 2N and Current Depth of d) | | | | Split Information 1 |
|---|---|---|---|---|---|
| Inter Skip (Only 2N × 2N) | Partition Type | Partition Type | Information 0 of Transformation Unit | Information 1 of Transformation Unit | having Lower Depth of d + 1 |
| | 2N × 2N<br>2N × N<br>N × 2N<br>N × N | 2N × nU<br>2N × nD<br>nL × 2N<br>nR × 2N | 2N × 2N | N × N<br>(Symmetrical Type)<br>N/2 × N/2<br>(Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about a partition type may indicate symmetrical partition types having sizes of 2N×2N, 2N×N, N×2N, and N×N, which are obtained by symmetrically splitting a height or width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on adjacent data units, encoding information of data units in deeper coding units adjacent to the current coding unit may be directly referred to and used.

Alternatively, if a current coding unit is predicted based on adjacent coding units, data units adjacent to the current coding unit are searched in deeper coding units by using encoded information of the adjacent deeper coding units, and the searched adjacent data units may be referred to for predicting the current coding unit.

Figure 19:
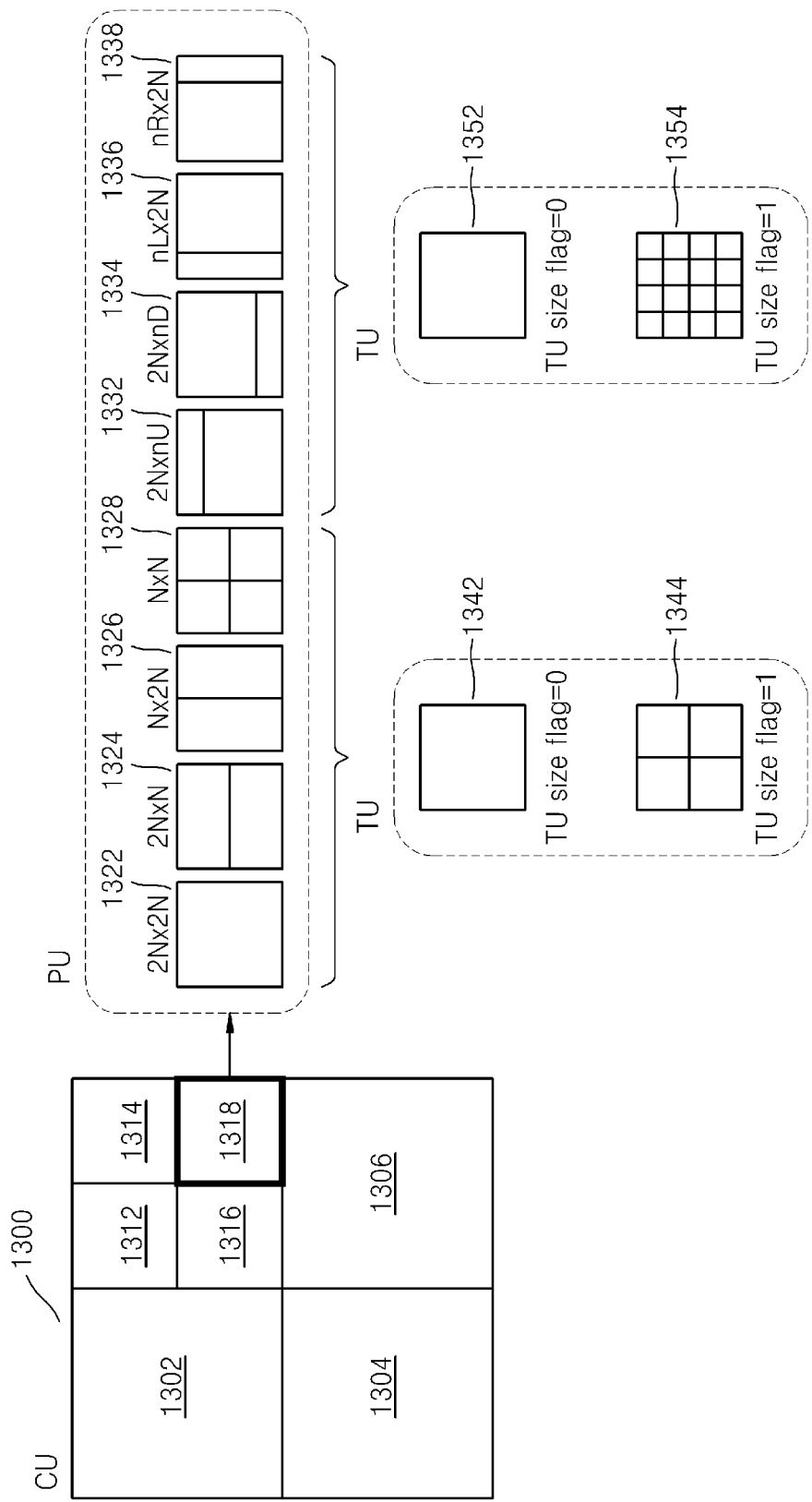
FIG. 19 is a diagram for describing a relationship between a coding unit, a prediction unit, and a transformation unit, according to encoding mode information of Table 1.

FIG. 19 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information about a transformation unit (TU size flag) is a kind of a transformation index, and a size of a transformation unit corresponding to a transformation index may be changed according to a prediction unit type or partition type of a coding unit.

For example, when information about a partition type is set to be symmetrical, e.g., the partition type 1322, 1324, 1326, or 1328, a transformation unit 1342 having a size of 2N×2N is set if the TU size flag is 0, and a transformation unit 1344 having a size of N×N is set if the TU size flag is 1.

When the information about a partition type is set to be asymmetrical, e.g., the partition type 1332, 1334, 1336, or 1338, a transformation unit 1352 having a size of 2N×2N is set if the TU size flag is 0, and a transformation unit 1354 having a size of N/2×N/2 is set if the TU size flag is 1.

Referring to FIG. 19, the TU size flag is a flag having a value of 0 or 1, but the TU size flag is not limited to 1 bit, and a transformation unit may be hierarchically split while the TU size flag increases from 0. The split information about a transformation unit may be used as an example of a transformation index.

In this case, the size of a transformation unit that has been actually used may be expressed by using a TU size flag, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be (a–1) 32×32 when a TU size flag is 0, the size of a transformation unit may be (a–2) 16×16 when the TU size flag is 1, and the size of a transformation unit may be (a–3) 8×8 when the TU size flag is 2.

As another example, if the size of the current coding unit is 32×32 and a minimum transformation unit size is 32×32, then the size of the transformation unit may be (b–1) 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\wedge}\text{MaxTransformSizeIndex})) \quad \text{Equation 1}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', is split a number of times corresponding to the maximum TU size flag when the TU size flag is 0, and 'MinTransformSize' denotes a minimum transformation unit size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad \text{Equation 2}$$

That is, if the current prediction mode is the inter mode, the transformation unit size 'RootTuSize' when the TU size flag is 0 may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad \text{Equation 3}$$

That is, if the current prediction mode is the intra mode, the transformation unit size 'RootTuSize' when the TU size flag is 0 may be a smaller value from among the maximum transformation unit size and the current partition unit size.

However, the current maximum transformation unit size 'RootTuSize' that varies according to a prediction mode in a partition unit is just an example and a cause determining the current maximum transformation unit size is not limited thereto.

Referring to FIGS. 7 through 19, image data in the spatial domain may be encoded for each coding unit having a tree structure according to the video encoding method based on coding units having a tree structure, and video that is a picture or a picture sequence may be restored by restoring the image data in the spatial domain while decoding the image data in the spatial domain for each maximum coding unit according to the video decoding method based on coding units having a tree structure. The restored video may be reproduced by a reproducing apparatus, stored in a storage medium, or transmitted through a network.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While the disclosure has been particularly shown and described with reference to exemplary embodiments thereof, it will be understood by those of ordinary skill in the art that various changes in form and details may be made therein without departing from the spirit and scope of the exemplary embodiments as defined by the appended claims. The exemplary embodiments should be considered in descriptive sense only and not for purposes of limitation. Therefore, the scope of the exemplary embodiments is defined not by the detailed description but by the appended claims, and all differences within the scope will be construed as being included in the exemplary embodiments.

The invention claimed is:

1. An intra prediction method comprising:
searching for a neighboring block restored prior to a current block from among blocks of an image;
checking whether the neighboring block found by the searching is a block restored in an intra mode and whether an intra mode of the current block is also a Combined Intra Prediction (CIP) mode in which only blocks pre-restored in the intra mode are referred to;
determining based on a checking result of the checking whether the found neighboring block is a reference block available for intra prediction of the current block; and
performing intra prediction on the current block by using sample values of the reference block determined as available for the intra prediction of the current block.

2. The intra prediction method of claim 1, wherein the searching for the neighboring block comprises searching for neighboring blocks restored prior to the current block before determining whether a prediction mode of the current block is an intra mode of the CIP mode, and the checking comprises checking whether each of the neighboring blocks found by the searching is restored in the intra mode and whether the intra mode of the current block is also the CIP mode.

3. The intra prediction method of claim 1, wherein the performing of the intra prediction comprises padding a region deviating from a boundary of the image with a sample value of a pixel adjacent to an inside of the boundary from among pixels of the reference block when the reference block deviates from the boundary of the image.

4. The intra prediction method of claim 3, wherein the performing of the intra prediction further comprises padding the region deviating from the boundary of the image with the sample value of the pixel adjacent to the inside of the boundary from among the pixels of the reference block when the reference block deviates from the boundary of the image regardless of whether the intra mode of the current block is the CIP mode.

5. An intra prediction apparatus comprising:
an intra reference block determiner configured to search for a neighboring block restored prior to a current block from among blocks of an image and determine whether the neighboring block found by the searching is a reference block available for intra prediction of the current block, based on a result of checking whether the found neighboring block is a block restored in an intra mode and whether an intra mode of the current block is also a Combined Intra Prediction (CIP) mode in which only blocks pre-restored in the intra mode are referred to; and
an intra predictor configured to perform intra prediction on the current block by using sample values of the reference block determined as available for the intra prediction of the current block.

6. The intra prediction apparatus of claim 5, wherein the intra reference block determiner searches for neighboring blocks restored prior to the current block before determining whether a prediction mode of the current block is an intra mode of the CIP mode and checks whether each of the neighboring blocks found by the searching is restored in the intra mode and whether the intra mode of the current block is also the CIP mode.

7. The intra prediction apparatus of claim 5, wherein the intra predictor pads a region deviating from a boundary of the image with a sample value of a pixel adjacent to an inside of the boundary from among pixels of the reference block when the reference block deviates from the boundary of the image.

8. The intra prediction apparatus of claim 7, wherein the intra predictor pads the region deviating from the boundary of the image with the sample value of the pixel adjacent to the inside of the boundary from among the pixels of the reference block when the reference block deviates from the boundary of the image regardless of whether the intra mode of the current block is the CIP mode.

9. A video decoding apparatus comprising:
a parser configured to restore samples by performing entropy decoding on a bit string parsed from a received bitstream;
an inverse transformer configured to restore samples by performing inverse quantization and inverse transformation on a quantized transformation coefficient from among the restored samples;
an intra predictor configured to search for a neighboring block restored prior to a current block, determine whether the neighboring block found by the searching is a reference block available for intra prediction of the current block based on a result of checking whether the found neighboring block is a block restored in an intra mode and whether an intra mode of the current block is also a Combined Intra Prediction (CIP) mode in which only blocks pre-restored in the intra mode are referred to, and perform intra prediction on the current block by using sample values of the reference block determined as available for the intra prediction of the current block, to perform the intra prediction on the current block that is in the intra mode from among the samples;
a motion compensator configured to perform motion compensation on blocks in an inter prediction mode from among the samples; and
a restorer configured to restore an image by using blocks restored by the inter prediction or the intra prediction.

10. The video decoding apparatus of claim 9, wherein the intra predictor is configured to search for neighboring blocks restored prior to the current block before determining based on CIP mode information of a current image parsed from the bitstream whether a prediction mode of the current block is an intra mode of the CIP mode, and check whether each of the neighboring blocks found by the searching is restored in the intra mode and whether the intra mode of the current block is also the CIP mode.

11. The video decoding apparatus of claim 9, wherein the intra predictor is configured to pad a region deviating from a boundary of the image with a sample value of a pixel adjacent to an inside of the boundary from among pixels of the reference block when the reference block deviates from the boundary of the image regardless of whether the intra mode of the current block is the CIP mode.

12. A video encoding apparatus comprising:
an intra predictor configured to search for a neighboring block restored prior to a current block, determine whether the neighboring block found by the searching is a reference block available for intra prediction of the current block based on a result of checking whether the found neighboring block is a block restored in an intra mode and whether an intra mode of the current block is also a Combined Intra Prediction (CIP) mode in which only blocks pre-restored in the intra mode are referred to, and perform intra prediction on the current block by using sample values of the reference block determined to be available for the intra prediction of the current block, to perform the intra prediction on the current block that is in the intra mode from among blocks of a video;
an inter predictor configured to perform inter prediction on blocks in an inter prediction mode from among the blocks;
a transformer and quantizer configured to perform transformation and quantization on a result of performing the intra prediction or the inter prediction; and
an output unit configured to output a bitstream generated by performing entropy encoding on samples including a quantized transformation coefficient generated as a result of the transformation and quantization.

13. The video encoding apparatus of claim 12, wherein the intra predictor is configured to search for neighboring blocks restored prior to the current block before determining based on CIP mode information of a current image parsed from the bitstream whether a prediction mode of the current block is an intra mode of the CIP mode, and check whether each of the neighboring blocks found by the searching is restored in the intra mode and whether the intra mode of the current block is also the CIP mode.

14. The video encoding apparatus of claim 12, wherein the intra predictor is configured to pad a region deviating from a boundary of the image with a sample value of a pixel adjacent to an inside of the boundary from among pixels of the reference block when the reference block deviates from the boundary of the image regardless of whether the intra mode of the current block is the CIP mode.

15. A non-transitory computer-readable recording medium having recorded thereon a program which causes a computer to perform an intra prediction method comprising:
   searching for a neighboring block restored prior to a current block from among blocks of an image;
   checking whether the neighboring block found by the searching is a block restored in an intra mode and whether an intra mode of the current block is also a Combined Intra Prediction (CIP) mode in which only blocks pre-restored in the intra mode are referred to;
   determining based on a checking result of the checking whether the found neighboring block is a reference block available for intra prediction of the current block; and
   performing intra prediction on the current block by using sample values of the reference block determined as available for the intra prediction of the current block.

\* \* \* \* \*